United States Patent
Simon et al.

(10) Patent No.: US 8,679,323 B2
(45) Date of Patent: Mar. 25, 2014

(54) PROCESS FOR MIDDLE DISTILLATE PRODUCTION FROM FISCHER-TROPSCH WAXES USING A MODIFIED-ZEOLITE-BASED CATALYST BY A BASIC TREATMENT

(75) Inventors: Laurent Simon, Villeurbanne (FR); Emmanuelle Guillon, Vourles (FR); Christophe Bouchy, Lyons (FR)

(73) Assignees: ENI S.P.A., Rome (IT); IFP Energies Nouvelles, Rueil Malmaison Cedex (FR)

( * ) Notice: Subject to any disclaimer, the term of this patent is extended or adjusted under 35 U.S.C. 154(b) by 416 days.

(21) Appl. No.: 12/942,315

(22) Filed: Nov. 9, 2010

(65) Prior Publication Data

US 2011/0120910 A1   May 26, 2011

(30) Foreign Application Priority Data

Nov. 10, 2009   (FR) ...................................... 09 05407

(51) Int. Cl.
 *C10G 47/20* (2006.01)
 *B01J 29/10* (2006.01)
(52) U.S. Cl.
 USPC ............... 208/110; 208/60; 208/85; 208/134; 208/950; 502/74; 502/79; 502/313
(58) Field of Classification Search
 USPC ............ 502/74, 79, 313, 339; 208/15, 25, 60, 208/85, 95, 110, 134, 950; 585/14
 See application file for complete search history.

(56) References Cited

U.S. PATENT DOCUMENTS

| | | | | |
|---|---|---|---|---|
| 5,118,482 | A * | 6/1992 | Narayana et al. | 423/713 |
| 5,292,983 | A * | 3/1994 | Sie | 585/733 |
| 5,601,798 | A * | 2/1997 | Cooper et al. | 423/700 |
| 6,171,474 | B1 * | 1/2001 | Kasztelan et al. | 208/111.01 |
| 6,420,296 | B2 * | 7/2002 | Mignard et al. | 502/79 |
| 6,635,681 | B2 * | 10/2003 | Moore et al. | 518/700 |
| 6,864,398 | B2 * | 3/2005 | O'Rear | 585/324 |
| 6,902,664 | B2 * | 6/2005 | Timken | 208/111.01 |
| 7,220,349 | B2 * | 5/2007 | Benazzi et al. | 208/58 |
| 7,727,376 | B2 * | 6/2010 | Adams et al. | 208/49 |
| 2003/0173252 | A1 * | 9/2003 | Vaarkamp | 208/111.35 |

FOREIGN PATENT DOCUMENTS

| | | |
|---|---|---|
| EP | 1661859 A1 | 5/2006 |
| WO | 0107538 A1 | 2/2001 |

OTHER PUBLICATIONS

Johnson et al, Effect of Micropore Topology on the Structure and Properties of Zeolite Polymer Replicas, Chem. Mater. 1997, vol. 9, Iss. 11; p. 2448-2458.*

(Continued)

*Primary Examiner* — Nina Bhat
*Assistant Examiner* — Jonathan Miller
(74) *Attorney, Agent, or Firm* — Millen, White, Zelano & Branigan, P.C.

(57) ABSTRACT

A process is described for the production of middle distillates from a paraffinic feedstock wherein the feedstock is subjected to hydrocracking and/or hydro-isomerization in the presence of a hydrocracking/hydro-isomerization catalyst. The catalyst comprises at least one hydro-dehydrogenating metal selected from metals of groups VIB and VIII, and a substrate that comprises at least one dealuminified Y zeolite. The dealuminified Y zeolite is modified by a basic treatment stage wherein the dealuminified Y zeolite is mixed with a basic aqueous solution, and at least one heat treatment stage.

21 Claims, 6 Drawing Sheets

(56) References Cited

OTHER PUBLICATIONS

Yousheng Tao, Hirofumi Kanoh, Lloyd Abrams, and Katsumi Kaneko, Mesopore-Modified Zeolites: Preparation, Characterization, and Applications, 2006, Chemical Reviews, vol. 106, No. 3, pp. 896-910.*

Institut National De La Propriete Industrielle. "Search Report." FR0905407, Applicant: IFP, Mailed: Jun. 24, 2010.

* cited by examiner

PROCESS FOR MIDDLE DISTILLATE PRODUCTION FROM FISCHER-TROPSCH WAXES USING A MODIFIED-ZEOLITE-BASED CATALYST BY A BASIC TREATMENT

TECHNICAL FIELD

This invention relates to a production of middle distillates from a paraffinic feedstock that is produced by Fischer-Tropsch synthesis, implementing a hydrocracking/hydroisomerization catalyst that comprises at least one hydro-dehydrogenating metal that is selected from the group that is formed by the metals of group VIB and group VIII of the periodic table and a substrate that comprises at least one dealuminified Y zeolite that has an initial overall atomic ratio of silicon to aluminum of between 2.5 and 20, a starting extra-lattice aluminum atom fraction by weight that is greater than 10%, relative to the total mass of aluminum that is present in the zeolite, a starting mesopore volume that is measured by nitrogen porosimetry that is greater than 0.07 ml.g$^{-1}$, and a starting crystalline parameter a$_o$ of the elementary mesh of between 24.38 Å and 24.30 Å, whereby said zeolite is modified by a) a basic treatment stage consisting in mixing said dealuminified Y zeolite with a basic aqueous solution, and at least one heat treatment stage c). The process for the production of middle distillates from a paraffinic feedstock that is produced by Fischer-Tropsch synthesis is performed at a temperature that is advantageously between 240 and 400° C., a pressure of between 1 and 9 MPa, an hourly volumetric flow rate of between 0.5 and 5 h$^{-1}$ (ratio of the hourly volumetric flow rate at 15° C. of fresh liquid feedstock to the volume of charged catalyst), and an adjusted hydrogen flow rate to obtain a ratio of 400 to 1,500 normal liters of hydrogen per liter of feedstock.

PRIOR ART

In the low-temperature Fischer-Tropsch process, the synthesis gas (CO+H$_2$) is transformed catalytically into oxidized products and into essentially linear hydrocarbons in gas, liquid or solid form. These products are generally free of heteroatomic impurities such as, for example, sulfur, nitrogen or metals. They also contain virtually little or no aromatic compounds, naphthenes, and more generally cyclic compounds, in particular in the case of cobalt catalysts. In contrast, they can exhibit a non-negligible content of oxidized products that, expressed in terms of weight of oxygen, is generally less than approximately 5% by weight and also a content of unsaturated compounds (olefinic products in general) that is generally less than 10% by weight. However, these products, primarily consisting of normal paraffins, cannot be used as such, in particular because of their cold strength properties that are not very compatible with the common uses of petroleum fractions. For example, the pour point of a linear hydrocarbon that contains 20 carbon atoms per molecule (boiling point that is equal to approximately 340° C., i.e., often encompassed in the middle distillate fraction) is approximately +37° C., which makes its use impossible, the specification being −15° C. for gas oil. The hydrocarbons that are obtained from the Fischer-Tropsch process—for the most part comprising n-paraffins—have to be transformed into more upgradable products, such as, for example, gas oil and kerosene, which are obtained, for example, after catalytic reactions of hydroisomerization and hydrocracking.

All of the catalysts that are currently used in hydroisomerization/hydrocracking are of the bifunctional type: combining an acid function with a hydrogenating function. The acid function is provided by substrates with large surface areas (in general 150 to 800 m$^2$.gl) having a superficial acidity, such as the halogenated aluminas (chlorinated or fluorinated in particular), phosphorous aluminas, combinations of boron oxide and aluminum oxide, and silica aluminas. The hydrogenating function is provided either by one or more metals of group VIII of the periodic table, such as iron, cobalt, nickel, ruthenium, rhodium, palladium, osmium, iridium and platinum, or by a combination of at least one metal of group VI, such as chromium, molybdenum and tungsten, and at least one metal of group VIII.

The equilibrium between the two acid and hydrogenating functions is one of the parameters that govern the activity and the selectivity of the catalyst. A weak acid function and a strong hydrogenating function provide catalysts that are not very active and selective as regards isomerization, whereas a strong acid function and a weak hydrogenating function provide catalysts that are very active and selective as regards cracking. A third possibility is to use a strong acid function and a strong hydrogenating function so as to obtain a catalyst that is very active but also very selective as regards isomerization. It is therefore possible, by carefully selecting each of the functions, to adjust the activity/selectivity pair of the catalyst.

The conventional catalysts of catalytic hydrocracking, for the large majority thereof, consist of weakly acidic substrates, such as silica aluminas, for example. These systems are used more particularly for producing middle distillates of very good quality. Many catalysts of the hydrocracking market have a silica-alumina base combined with a metal of group VIII. These systems have a very good selectivity of middle distillates, and the products that are formed are of good quality (U.S. Pat. No. 6,733,657). The drawback of all of these catalytic systems that are based on silica alumina is, as has been said, their low activity. By contrast, the catalytic systems that are based on zeolite (in particular USY or beta zeolite) are very active for the hydrocracking reaction but not very selective.

The modification of zeolite by alkaline treatment is a process that has been studied in open literature. This process for modification by alkaline treatment makes it possible to create mesoporosity in certain types of zeolites such as the microporous ZSM-5 zeolite in Ogura et al., Applied Catal. A:General, 219 (2001) 33, Groen et al., Colloids and Surfaces A:Physicochem. Eng. Aspects 241 (2004) 53, and Groen et al., Microporous and Mesoporous Materials, 69 (2004) 29, the FER in Groen et al., Microporous and Mesoporous Materials. 69 (2004) 29, the MOR in Groen et al., Microporous and Mesoporous Materials, 69 (2004) 29, and Groen et al., J. Catal. 243 (2006) 212 or the BEA zeolite, Groen et al., Microporous and Mesoporous Materials, 69 (2004) 29, Groen et al., J. Catal. 243 (2006) 212, and Groen et al., Microporous and Mesoporous Materials, 114 (2008) 93, and the catalysts that are obtained been used for different catalytic reactions. These studies show that the alkaline treatment makes it possible to remove silicon atoms from the structure, thus creating a mesoporosity. The creation of mesoporosity and maintaining the crystallinity and acidic properties of the zeolite are identified in these publications as being linked to the initial overall Si/Al molar ratio of zeolites, whereby said optimal overall Si/Al ratio is to be between 20 and 50. Actually, outside of this overall Si/Al ratio range of between 20 and 50, and, for example, for an overall Si/Al ratio that is less than 20, the structure of the zeolite is very stable because of the presence of a large number of aluminum atoms that prevent the extraction of silicon atoms and therefore the creation of additional mesoporosity.

ADVANTAGE OF THE INVENTION

The dealuminified Y zeolite contains mesopores, created by extracting aluminum atoms from the framework of the zeolite. The presence of mesopores makes it possible to improve the selectivity of middle distillates of hydrocracking catalysts that implement such a zeolite by facilitating the diffusion of primary products of the reaction (jet fuels and gas oils) and thus by limiting the supercracking of light products. However, the extraction of the aluminum atoms from the framework reduces the Brønsted acidity of said zeolite and therefore its catalytic activity. The gain in selectivity of middle distillates linked to the mesoporosity of the zeolite is therefore done to the detriment of the catalytic activity.

The research work performed by the applicant on the modification of numerous zeolites and crystallized microporous solids and on the hydrogenating active phases has led to the discovery that, surprisingly enough, a catalyst that is used in a process for hydrocracking and/or hydroisomerization that comprises at least one hydro-dehydrogenating metal that is selected from the group that is formed by the metals of group VIB and group VIII of the periodic table, taken by themselves or in a mixture, and a substrate that comprises at least one dealuminitied Y zeolite and that contains a specific extra-lattice aluminum atom fraction by weight, whereby said zeolite is modified by a) a basic treatment stage consisting in the mixing of said dealuminified Y zeolite with a basic aqueous solution that makes it possible to remove silicon atoms from the structure and to insert extra-lattice aluminum atoms into the framework of the zeolite, and at least one heat treatment stage c), made it possible to obtain an activity, i.e., a higher conversion level, of hydrocracking Fischer-Tropsch waxes, and a selectivity of higher middle distillates (kerosene and gas oils).

Without being tied to any particular theory, the applicant thinks that the basic treatment of the zeolite that is dealuminified and that contains a specific starting extra-lattice aluminum atom fraction by weight makes possible the creation of mesopores that form a lattice of interconnected mesopores up to the surface of the zeolite crystals, by desilication, i.e., by extraction of the silicon atoms from the framework of the starting zeolite. The creation of mesoporosity that is accessible by the outside surface of the zeolite crystals, promoting the intercrystalline diffusion of the molecules, makes it possible for a catalyst that implements said modified zeolite according to the invention, used in a process for production of middle distillates, to obtain a higher selectivity of middle distillates. Furthermore, the basic treatment also allows the realuminification, i.e., the reintroduction, of at least a portion of the extra-lattice aluminum atoms that are present in the starting zeolite in the framework of the modified zeolite, whereby this realuminification makes possible an increase of the Brønsted acidity of the modified zeolite, resulting—for a catalyst using said modified zeolite according to the invention—in improved catalytic properties, i.e., a better conversion.

One objective of the invention is therefore to provide a process for hydrocracking and/or hydroisomerization of Fischer-Tropsch waxes implementing a catalyst that is based on a zeolite that is modified by a basic treatment making it possible to reach a higher conversion as well as a better selectivity of middle distillates.

DETAILED DESCRIPTION OF THE CATALYST ACCORDING TO THE INVENTION

According to the invention, the process implements a catalyst comprising an active phase comprising at least one hydro-dehydrogenating metal that is selected from among the metals of group VIB and group VIII of the periodic table, taken by themselves or in a mixture.

Preferably, the elements of group VIII are selected from among iron, cobalt, nickel, ruthenium, rhodium, palladium, osmium, iridium or platinum, taken by themselves or in a mixture.

In the case where the elements of group VIII are selected from among the noble metals of group VIII, the elements of group VIII are advantageously selected from among platinum and palladium, taken by themselves or in a mixture.

In the case where the elements of group VIII are selected from among the non-noble metals of group VIII, the elements of group VIII are advantageously selected from among iron, cobalt and nickel, taken by themselves or in a mixture.

Preferably, the elements of group VIB of the catalyst according to this invention are selected from among tungsten and molybdenum, taken by themselves or in a mixture.

In the case where the hydrogenating function comprises an element of group VIII and an element of group VIB, the following metal combinations are preferred: nickel-molybdenum, cobalt-molybdenum, nickel-tungsten, cobalt-tungsten, and in a very preferred manner: nickel-molybdenum, cobalt-molybdenum, and nickel-tungsten. It is also possible to use combinations of three metals, such as, for example, nickel-cobalt-molybdenum.

When a combination of metals of group VIB and group VIII is used, the catalyst is then preferably used in a sulfurized form.

In the case where the catalyst comprises at least one metal of group VIB in combination with at least one non-noble metal of group VIII, the metal content of group VIB is advantageously, in oxide equivalent, between 5 and 40% by weight relative to the total mass of said catalyst, in a preferred manner between 10 and 35% by weight, and in a very preferred manner between 15 and 30% by weight, and the non-noble metal content of group VIII is advantageously, in oxide equivalent, between 0.5 and 10% by weight relative to the total mass of said catalyst, in a preferred manner between 1 and 8% by weight, and in a very preferred manner between 1.5 and 6% by weight.

In the case where the catalyst comprises at least one metal of group VIB in combination with at least one non-noble metal of group VIII, said catalyst can also advantageously comprise at least one dopant that is selected from the group that consists of silicon, boron and phosphorus, taken by itself or in a mixture, whereby the dopant content is preferably between 0 and 20% by weight of oxide of the dopant, in a preferred manner between 0.1 and 15% by weight, in a very preferred manner between 0.1 and 10% by weight, and in an even more preferred manner between 0.5 and 6% by weight relative to the total mass of the catalyst.

When the hydro-dehydrogenating element is a noble metal of group VIII, the catalyst preferably contains a noble metal content of between 0.01 and 10% by weight, and in an even more preferred manner of 0.02 to 5% by weight relative to the total mass of said catalyst. The noble metal is preferably used in its reduced and non-sulfurized form.

It is advantageously also possible to use a catalyst with a reduced and non-sulfurized nickel base. In this case, the content of metal in its oxide form is advantageously between 0.5 and 25% by weight relative to the finished catalyst. Preferably, the catalyst also contains, in addition to the reduced nickel, a metal of group IB and preferably copper, or a metal of group IVB and preferably tin in proportions such that the ratio by mass of the metal of group IB or IVB and of nickel to the catalyst is advantageously between 0.03 and 1.

According to the invention, the catalyst that is used in the process according to the invention comprises a substrate that comprises at least one modified zeolite according to the invention and advantageously an oxide-type porous mineral matrix, whereby said substrate comprises and preferably consists of, preferably:

- 0.1 to 99.8% by weight, preferably 0.1 to 80% by weight, in an even more preferred manner 0.1 to 70% by weight, and in a very preferred manner 0.1 to 50% by weight of modified zeolite according to the invention relative to the total mass of the catalyst,
- 0.2 to 99.9% by weight, preferably 20 to 99.9% by weight, in a preferred manner 30 to 99.9% by weight, and in a very preferred manner 50 to 99.9% by weight relative to the total mass of catalyst, of at least one oxide-type porous mineral matrix.

The Zeolite According to the Invention

According to the invention, the initially used zeolite that is suitable for the implementation of the substrate of the catalyst that is implemented in the process for hydrocracking and/or hydroisomerization of paraffinic feedstock produced by Fischer-Tropsch synthesis is the FAU-structural-type dealuminified Y zeolite (USY).

According to the invention, before being modified, the starting dealuminified Y zeolite that is suitable for implementing the substrate of the catalyst that is used in the process for hydrocracking and/or hydroisomerization of the paraffinic feedstock that is produced by Fischer-Tropsch synthesis has an initial overall atomic ratio of silicon to aluminum of between 2.5 and 20.0, preferably between 2.6 and 12.0, and in a preferred manner between 2.7 and 10.0, a starting extra-lattice aluminum atom fraction by weight that is greater than 10%, preferably greater than 20%, and in a preferred manner greater than 30% by weight relative to the total mass of aluminum that is present in the zeolite, a starting mesopore volume that is measured by nitrogen porosimetry that is greater than 0.07 ml.g$^{-1}$, preferably greater than 0.10 ml.g$^{-1}$, and in a preferred manner greater than 0.13 ml.g$^{-1}$, and a starting crystalline parameter $a_o$ of the elementary mesh of between 24.38 Å and 24.30 Å.

Preferably, before being modified, the starting dealuminified Y zeolite that is suitable for the implementation of the substrate of the catalyst that is used in the process for hydrocracking and/or hydroisomerization according to the invention has a starting micropore volume that is measured by nitrogen porosimetry that is greater than 0.20 ml.g$^{-1}$, and preferably greater than 0.25 ml.g$^{-1}$.

According to the invention, said starting dealuminified Y zeolite that has an initial overall atomic ratio of silicon to Si/Al of between 2.5 and 20.0, preferably between 2.6 and 12.0, and in a preferred manner between 2.7 and 10.0, whereby said overall Si/Al atomic ratio is measured by X fluorescence (XF) and has a starting extra-lattice aluminum atom fraction by weight that is measured by NMR of the aluminum, is greater than 10%, preferably greater than 20%, and in a preferred manner greater than 30% by weight relative to the total mass of the aluminum that is present in the zeolite is obtained by dealuminification of a FAU-structural-type Y zeolite by all of the dealuminification methods that are known to one skilled in the art.

Preparation of the Starting Dealuminified Y Zeolite

The FAU-structural-type Y zeolite that advantageously comes in NaY form after synthesis can advantageously undergo one or more ion exchanges before undergoing the dealuminification stage.

The dealuminification treatment of the FAU-structural-type Y zeolite that generally has an overall Si/Al atomic ratio after synthesis of between 2.3 and 2.8 can advantageously be implemented by all of the methods that are known to one skilled in the art. In a preferred manner, the dealuminification is implemented by a heat treatment in the presence of water vapor (or steaming according to English terminology) and/or by one or more acid attacks that are advantageously implemented by treatment with an aqueous solution of a mineral or organic acid.

Preferably, the dealuminification is implemented by a heat treatment followed by one or more acid attacks or only by one or more acid attacks.

Preferably, the heat treatment in the presence of water vapor to which the Y zeolite is subjected is implemented at a temperature of between 200 and 900° C., preferably between 300 and 900° C., and in an even more preferred manner between 400 and 750° C. The time period of said heat treatment is advantageously greater than or equal to 0.5 hour, preferably between 0.5 hour and 24 hours, and in a very preferred manner between 1 hour and 12 hours. The volumetric percentage of water vapor during the heat treatment is advantageously between 5 and 100%, preferably between 20 and 100%, in a manner between 40% and 100%. The volumetric fraction, except for the water vapor that is optionally present, is formed by air. The flow rate of gas formed by water vapor and optionally air is advantageously between 0.2 L/h/g and 10 L/h/g of the Y zeolite.

The heat treatment makes it possible to extract aluminum atoms from the framework of the Y zeolite while keeping the overall Si/Al atomic ratio of the treated zeolite unchanged.

The heat treatment in the presence of water vapor is advantageously repeated as many times as is necessary for obtaining the starting dealuminified Y zeolite that is suitable for the implementation of the substrate of the catalyst that is used in the process according to the invention that has the desired characteristics and, in particular, an extra-lattice aluminum atom fraction by weight that represents more than 10% by weight relative to the total aluminum mass present in said zeolite. The heat treatment number is advantageously less than 4 and preferably a single heat treatment is implemented at the end of which the starting extra-lattice aluminum atom fraction by weight is measured by NMR of the aluminum.

So as to implement a dealuminification of said Y zeolite and to adjust the overall Si/Al atomic ratio of the dealuminified Y zeolite to a value of between 2.5 and 20 according to the invention, it is necessary to properly select and monitor the operating conditions of each acid attack stage. In particular, the temperature at which the treatment by the aqueous solution of a mineral or organic acid is implemented, the nature and the concentration of the acid that is used, the ratio between the quantity of acid solution and the weight of treated zeolite, the period of the acid attack treatment, and the treatment number implemented are significant parameters for the implementation of each acid attack stage.

The acid that is selected for the implementation of said acid attack stage is advantageously either a mineral acid or an organic acid, preferably the acid is a mineral acid that is selected from among nitric acid $HNO_3$, hydrochloric acid HCl, and sulfuric acid $H_2SO_4$. In a very preferred manner, the acid is nitric acid. When an organic acid is used for the acid attack, the acetic acid $CH_3CO_2N$ is preferred.

Preferably, the acid attack treatment of the Y zeolite by an aqueous solution of a mineral acid or an organic acid is implemented at a temperature of between 30° C. and 120° C., preferably between 50° C. and 120° C., and in a preferred manner between 60 and 100° C. The concentration of acid in the aqueous solution is advantageously between 0.05 and 20 $mol.L^{-1}$, preferably between 0.1 and 10 $mol.L^{-1}$, and in a more preferred manner between 0.5 and 5 $mol.L^{-1}$. The ratio between the volume of acid solution V in ml and the weight of treated Y zeolite P in grams is advantageously between 1 and 50, and preferably between 2 and 20. The time period of the acid attack is advantageously greater than 1 hour, preferably between 2 hours and 10 hours, and in a preferred manner between 2 hours and 8 hours. The successive acid attack treatment number of the Y zeolite by an acidic aqueous solution is advantageously less than 4. In the case where multiple successive acid attack treatments are implemented, aqueous solutions of a mineral or organic acid of different acidic concentrations can be used.

So as to adjust the overall Si/Al atomic ratio of the dealuminified Y zeolite to a value of between 2.5 and 20, said ratio is measured by X fluorescence at the end of each acid attack treatment that is implemented.

After having carried out the acid attack treatment(s), the zeolite is then advantageously washed with distilled water and then is dried at a temperature of between 80 and 140° C. for a time period of between 10 and 48 hours.

The acid attack treatment makes it possible both to extract aluminum atoms from the framework and to extract the aluminum atoms from the pores of the zeolitic solid. Thus, the overall Si/Al atomic ratio of the dealuminified Y zeolite that is obtained increases to a value of between 2.5 and 20, whereby said zeolite is suitable for the implementation of the substrate of the catalyst that is used in the process according to the invention.

Likewise, said starting dealuminified Y zeolite that is obtained and that is suitable for the implementation of the substrate of the catalyst that is used in the process according to the invention has, after dealuminification, a starting mesopore volume that is measured by nitrogen porosimetry that is greater than $0.07\ ml.g^{-1}$, preferably greater than $0.10\ ml.g^{-1}$, and in a preferred manner greater than $0.13\ ml.g^{-1}$, the creation of mesoporosity resulting from the extraction of aluminum atoms from the pores of the zeolitic solid and a starting crystalline parameter $a_o$ of the elementary mesh of between 24.38 Å and 24.30 Å.

Said starting dealuminified Y zeolite that is obtained also advantageously has a starting micropore volume that is measured by nitrogen porosimetry that is greater than $0.20\ ml.g^{-1}$ and preferably greater than $0.25\ ml.g^{-1}$.

The micropore and mesopore volumes of the dealuminified Y zeolite are measured by nitrogen adsorption/desorption, and the mesh parameter of the zeolite is measured by x-ray diffraction (XRD).

Process for Modification of the Starting Dealuminified Y Zeolite According to the Invention According to the invention, the starting dealuminified Y zeolite that is suitable for the implementation of the substrate of the catalyst that is used in the process according to the invention is modified by a specific modification process that comprises a) a basic treatment stage that consists of the mixing of said dealuminified USY zeolite with a basic aqueous solution, whereby said basic aqueous solution is a solution of basic compounds selected from among the alkaline bases and the strong non-alkaline bases, whereby said stage a) is implemented at a temperature of between 40 and 100° C. and for a time period of between 5 minutes and 5 hours, and at least one heat treatment stage c) that is implemented at a temperature of between 200 and 700° C.

The basic treatment stage a) makes it possible to remove silicon atoms from the structure and to insert extra-lattice aluminum atoms into the framework.

According to the invention, the process for modification of said starting dealuminified Y zeolite comprises a basic treatment stage a) that consists in mixing said dealuminified USY zeolite with a basic aqueous solution, said basic aqueous solution being a solution of basic compounds selected from among the alkaline bases and the strong non-alkaline bases, whereby said stage a) is implemented at a temperature of between 40 and 100° C. and for a time period of between 5 minutes and 5 hours.

The basic compounds that are selected from among the alkaline bases are preferably selected from among the alkaline carbonates and the alkaline hydroxides, whereby the alkaline cations, alkaline carbonates, and alkaline hydroxides advantageously belong to the group IA or IIA of the periodic table, and the strong non-alkaline bases are preferably selected from among the quaternary ammonium compounds, taken by themselves or in a mixture, and in a preferred manner, the strong non-alkaline base is tetramethylammonium hydroxide.

Said alkaline cations, alkaline carbonates and alkaline hydroxides that advantageously belong to group IA or IIA of the periodic table are preferably selected from among the cations $Na^+$, $Li^+$, $K^+$, $Rb^+$, $Cs^+$, $Ba^{2+}$, and $Ca^{2+}$, and in a very preferred manner, said cation is the $Na^+$ or $K^+$ cation.

Preferably, the aqueous solution is a solution of sodium carbonate or sodium hydroxide, and in a preferred manner, the aqueous solution is a sodium hydroxide solution.

Said basic aqueous solution with a concentration of between 0.001 mol/L and 0.12 mol/L, in a preferred manner with a concentration of between 0.005 mol/L and 11 mol/L, and in an even more preferred manner with a concentration of between 0.01 mol/L, and 9 mol/L.

According to the invention, the basic treatment stage a) of the process for modification of said starling deal minified USY zeolite is implemented under conditions of temperatures of between 40 and 100° C. (reflux) and in a preferred manner between 40 and 90° C., and for a time period of between 5 minutes and 5 hours, in a preferred manner between 15 minutes and 4 hours, and in an even more preferred manner between 15 minutes and 3 hours.

Once the basic treatment of said zeolite is ended, the solution is cooled quickly to ambient temperature, and then said zeolite is separated from the liquid by all of the techniques that are known to one skilled in the art. The separation can be implemented by filtration or by centrifuging, and in a preferred manner by centrifuging. The modified USY zeolite that is obtained is then washed with distilled water at a temperature of between 20 and 100° C., and preferably at a temperature of between 40 and 80° C., and in a very preferred manner at 50° C., and it is dried at a temperature of between 80 and 150° C., and preferably between 100 and 130° C., and in a very preferred manner at 120° C.

In the case where the basic treatment stage a) consists of the mixing of said starting dealuminified Y zeolite with a basic aqueous solution of compounds selected from among the alkaline bases, the zeolite that is contained in the substrate of the catalyst that is used in the process according to the invention contains, at the end of stage a) of the modification process, a partial or total fraction of alkaline ions in cationic position.

In the case where the basic treatment stage a) consists of the mixing of said starting dealuminified Y zeolite with a basic aqueous solution of compounds selected from among the non-alkaline bases, the zeolite that is contained in the substrate of the catalyst that is used in the process according to the invention contains, at the end of stage a) of the modification process, a partial or total fraction of quaternary ammonium ions in cationic position.

During the basic treatment stage a) of the process for modification of the starting dealuminified Y zeolite according to the invention, a portion of the silicon atoms contained in the framework of said zeolite are extracted; the phenomenon is called desilication, creating vacuums in the structure and the formation of mesoporosity and/or making possible the reinsertion of at least a portion of the fraction of extra-lattice aluminum atoms that are present in said starting dealuminified Y zeolite, instead of the silicon atoms that are extracted by desilication and thus making possible the formation of new Brønsted acid sites. This second phenomenon is called realuminification.

In the case where the basic treatment stage a) consists of the mixing of said starting dealuminified USY zeolite with a basic aqueous solution of basic compounds selected from among the alkaline bases and preferably selected from among the alkaline carbonates and the alkaline hydroxides and in a very preferred manner with a sodium hydroxide solution (NaOH), the process for modification of said starting dealuminified USY zeolite advantageously comprises a stage b) of at least a partial or total exchange of said alkaline cations, belonging to the groups IA and IIA of the periodic table that are introduced during stage a) and that are present in cationic position, by $NH_4^+$ cations, and preferably $Na^+$ cations by $NH_4^+$ cations.

Partial or total exchange of alkaline cations by $NH_4^+$ cations is defined as the 80 to 100% exchange, in a preferred manner the 85 to 99.5% exchange, and in a more preferred manner the 88 and 99% exchange, of said alkaline cations by $NH_4^+$ cations. The remaining quantity of alkaline cations and preferably the quantity of $Na^+$ cations remaining in the modified zeolite, relative to the quantity of $NH_4^+$ cations initially present in the zeolite, at the end of stage b), is advantageously between 0 and 20%, preferably between 0.5 and 15%, and in a preferred manner between 1 and 12%.

Preferably, for this stage, multiple ion exchanges are initiated with a solution that contains at least one ammonium salt that is selected from among the salts of chlorate, sulfate, nitrate, phosphate, or ammonium acetate, so as to eliminate at least partially the alkaline cations and preferably the $Na^+$ cations that are present in the zeolite. Preferably, the ammonium salt is the ammonium nitrate $NH_4NO_3$.

Thus, the remaining content of alkaline cations and preferably $Na^+$ cations in the modified zeolite at the end of stage b) is preferably such that the alkaline cation/aluminum molar ratio and preferably the Na/Al molar ratio is between 0.2:1 and 0:1, preferably between 0.15:1 and 0.005:1, and in an even more preferred manner between 0.12:1 and 0.01:1.

The desired Na/Al ratio is obtained by adjusting the $NH_4^+$ concentration of the cation exchange solution, the temperature of the cation exchange, and the cation exchange number. The concentration of the $NH_4^+$ solution in the solution advantageously varies between 0.01 and 12 mol/L, and preferably between 1 and 10 mol/L. The temperature of the exchange stage is advantageously between 20 and 100° C., preferably between 60 and 95° C., in a preferred manner between 60 and 90° C., and in a more preferred manner between 60 and 85° C., and in an even more preferred manner between 60 and 80° C. The cation exchange number advantageously varies between 1 and 10 and preferably between 1 and 4.

In the case where the basic treatment stage a) consists in the mixing of said starting dealuminified USY zeolite with an aqueous solution of basic compounds selected from among the strong non-alkaline bases that are preferably selected from among the quaternary ammonium compounds, taken by themselves or in a mixture, and in a preferred manner the strong non-alkaline base being tetramethylammonium hydroxide, the modified zeolite that is obtained from stage a) contains a partial or total fraction of quaternary ammonium ions in cationic position.

In this case, the process for modification of said starting dealuminified USY zeolite advantageously does not comprise stage b) of at least a partial or total intermediate exchange; the modified zeolite obtained from stage a) directly undergoes the heat treatment stage c).

According to the invention, the process for modification of the starting dealuminified Y zeolite then comprises at least one heat treatment stage c).

In the case where the basic treatment stage a) consists of the mixing of said starting dealuminified USY zeolite with a basic aqueous solution of compounds that are selected from among the alkaline bases and preferably selected from among the alkaline carbonates and the alkaline hydroxides, and in a very preferred manner with a sodium hydroxide solution (NaOH), the heat treatment stage c) makes possible both the drying and the transformation of the $NH_4^+$ cations, exchanged during stage b), into protons.

In the case where the basic treatment stage a) consists of the mixing of said starting dealuminified USY zeolite with a basic aqueous solution of compounds that are selected from among the strong non-alkaline bases and preferably selected from among the quaternary ammonium compounds that are taken by themselves or in a mixture, and whereby in a preferred manner, the strong non-alkaline base is tetramethylammonium hydroxide, the heat treatment stage c) makes possible both the drying and the decomposition of quaternary ammonium cations in a position of counterions and the formation of protons.

In all of the cases, at the end of said heat treatment stage c); the protons of the zeolite are partially or totally regenerated.

The heat treatment stage c) according to the invention is implemented at a temperature that is preferably between 200 and 700° C., more preferably between 300 and 500° C. Said heat treatment stage is advantageously implemented in air, in oxygen, in hydrogen, in nitrogen or in argon, or in a mixture of nitrogen and argon. The time period of said treatment is advantageously between 1 and 5 hours.

At the end of the modification process according to the invention, the final modified zeolite that is implemented in the substrate of the catalyst that is used in the process according to the invention advantageously has a final mesopore volume, measured by nitrogen porosimetry, that is greater than at least 10% relative to the starting mesopore volume and preferably greater than at least 20% relative to the starting mesopore volume of the starting dealuminified USY zeolite, a final micropore volume that is measured by nitrogen porosimetry that should not decrease by more than 40%, preferably by more than 30%, and in a preferred manner by more than 20% relative to the starting micropore volume of said starting dealuminified USY zeolite, a Brønsted acidity that is greater by more than 10% and preferably by more than 20% relative to the Brønsted acidity of the starting dealuminified Y zeolite, and a final crystalline parameter $a_o$ of the elementary mesh that is greater than the starting crystalline parameter $a_o$ of the mesh of the starting dealuminified Y zeolite.

At the end of the process for modification of the dealuminified Y zeolite according to the invention, the significant increase of the mesopore volume of the resulting modified zeolite and the maintaining of a significant micropore volume relative to the starting dealuminified Y zeolite reflect the creation of an additional mesoposity by desilication.

Furthermore, the increase of the Brønsted acidity of the final modified zeolite relative to the starting dealuminified Y zeolite demonstrates the reintroduction of the extra-lattice aluminum atoms into the framework of the zeolite, i.e., the realuminification phenomenon.

The Amorphous or Poorly Crystallized Oxide-Type Porous Mineral Matrix

The substrate of the catalyst that is used in the hydrocracking and/or hydrotreatment process according to the invention advantageously contains a porous mineral matrix, preferably amorphous, which advantageously consists of at least one refractory oxide. Said matrix is advantageously selected from the group that is formed by alumina, silica, clays, titanium oxide, boron oxide, and zirconia, taken by itself or in a mixture. The matrix can consist of a mixture of at least two of the oxides cited above, and preferably silica alumina. It is also possible to select the aluminates. It is preferred to use matrices that contain alumina in all of these forms that are known to one skilled in the art, for example gamma-alumina.

It is also advantageously possible to use mixtures of alumina and silica, and mixtures of alumina and silica alumina.

Techniques of Characterization

The overall Si/Al atomic ratio of the starting and final dealuminified Y zeolite, i.e., after modification, is measured by X fluorescence. The X fluorescence is a comprehensive elementary analysis technique that makes possible the analysis of all of the elements of the periodic system starting from boron. It is possible to meter from several ppm up to 100%. In this invention, this technique is used to meter the silicon and the aluminum of the zeolites (in mass percent) and thus makes it possible to calculate the Si/Al atomic ratio.

The fraction by weight of the tetracoordinated and hexacoordinated aluminum atoms that are present in the modified USY zeolite is determined by nuclear magnetic resonance of the $^{27}Al$ solid. The NMR of the aluminum is actually known for being used for the purpose of referencing and quantifying the different states of coordination of this core ("Analyse physico-chimiques des catalyseurs industriels [Physico-Chemical Analysis of the industrial Catalysts]," J. Lynch, Editions Technip (2001) Chap. 13, pages 290 and 291). The NMR spectrum of the aluminum of the starting USY zeolite and that of the modified USY zeolite according to the invention exhibits two signals, one being characteristic of the resonance of tetracoordinated aluminum atoms (i.e., aluminum atoms in the crystalline lattice of the zeolite), and the other being characteristic of the resonance of the hexacoordinated aluminum atoms (i.e., aluminum atoms beyond the crystalline lattice or extra-lattice aluminum atoms). The tetracoordinated aluminum atoms $Al_{IV}$ resonate with a chemical displacement of between +40 ppm and +75 ppm, and the hexacoordinated or extra-lattice aluminum atoms $Al_{VI}$ resonate with a chemical displacement of between −15 ppm and +15 ppm. The fractions by weight of the two aluminum radicals $Al_{IV}$ and $Al_{VI}$ are quantified by integration of the signals that correspond to each of these radicals.

More specifically, the USY zeolite that is modified according to the invention that is present in the substrate of the catalyst according to the invention has been analyzed by NMR-MAS of the $^{27}Al$ solid on a 400 MHz Avance-type Brücker spectrometer using a 4 mm probe that is optimized for $^{27}Al$. The speed of rotation of the sample is close to 14 kHz. The aluminum atom is a quadripolar core whose spin is equal to 5/2. Under so-called selective analysis conditions, namely a low radiofrequency field that is equal to 30 kHz, a low impulse angle that is equal to π/2 and in the presence of a water-saturated sample, the NMR technique with magic angle spinning (MAS), denoted NMR-MAS, is a quantitative technique. The decomposition of each NMR-MAS spectrum makes it possible to access directly the quantity of different aluminum radicals, namely tetracoordinated aluminum atoms $Al_{IV}$ and hexacoordinated or extra-lattice aluminum atoms $Al_{VI}$. Each spectrum is locked in chemical displacement relative to a 1M aluminum nitrate solution for which the aluminum signal is at zero ppm. The signals that characterize the tetracoordinated aluminum atoms $Al_{IV}$ are integrated between +40 ppm and +75 ppm, which corresponds to the area 1, and the signals that characterize the hexacoordinated aluminum atoms $Al_{VI}$ are integrated between −15 ppm and +15 ppm, which corresponds to the area 2. The fraction by weight of the hexacoordinated aluminum atoms $Al_{VI}$ is equal to the ratio of area 2/(area 1+area 2).

The crystalline mesh parameter a0 of the starting and final dealuminified Y zeolites, i.e., after modification, is measured by X-ray diffraction (XRD). For the FAU-type Y zeolite, the mesh parameter a0 is calculated starting from the positions of the peaks corresponding to the Miller indices 533, 642, and 555 ("Théorie et technique de la radiocristallographie [Theory and Technique of Radiocrystallography]," A. Guinier, Dunod Edition, 1964). With the length of the Al—O bond being larger than that of the Si—O bond, the larger the aluminum number in tetrahedral position in the framework of the zeolite, the larger the parameter a0. For the crystals that consist of cubic meshes such as the FAU-type Y zeolites, a linear relationship exists between the mesh parameter aO and the Si/Al ratio, ("Hydrocracking Science and Technology," J. Scherzer, A. J. Gruia, Marcel Dekker Inc., 1996).

The micropore and mesopore volumes of the starting and final dealuminified Y zeolite are measured by nitrogen adsorption/desorption. The analysis of the nitrogen adsorption isotherm curves of the microporous and mesoporous solids makes possible the calculation of the pore volumes by the technique called volumetric technique. Different types of models can be used. The pore distribution that is measured by nitrogen adsorption has been determined by the Barrett-Joyner-Halenda (BJH) model. The nitrogen adsorption-desorption isotherm according to the BJH model is described in the periodical "The Journal of American Society," 73, 373, (1951) written by E. P. Barrett, L. G. Joyner and P. P. Halenda. In the following disclosure of the invention, nitrogen adsorption volume is defined as the volume that is measured for P/PO=0.95. The micropore volume is obtained by the "t-plot" method or else by measuring the volume adsorbed with $P/P_o$=0.35 (P=adsorption pressure; PO=saturating vapor pressure of the adsorbate at the temperature of the test). The mesopore volume is obtained by subtracting the micropore volume from the total pore volume.

The Lewis and Brønsted acidity of the zeolites is measured by pyridine adsorption followed by infrared spectroscopy (FTIR). The integration of characteristic bands of the coordinated pyridine at 1,455 $cm^{-1}$ and the protonated pyridine at 1,545 $cm^{-1}$ makes it possible to compare the relative acidity of Lewis- and Brønsted-type catalysts, respectively. Before adsorption of the pyridine, the zeolite is pretreated under secondary vacuum at 450° C. for 10 hours with an intermediate plateau level for 1 hour at 150° C. The pyridine is then adsorbed at 150° C., and then desorbed under secondary vacuum at this same temperature before the spectra are taken.

Preparation of the Catalyst

The modified zeolite can be, without this being limiting, for example, in the form of powder, ground powder, suspension, and a suspension that has undergone a deagglomeration treatment. Thus, for example, the modified zeolite can advantageously be put into a suspension that may or may not be slightly acidic at a concentration that is adjusted to the final zeolite content that is targeted in the substrate. This suspension, commonly called a slip, is then advantageously mixed with the precursors of the matrix.

According to a preferred preparation method, the modified zeolite can advantageously be introduced during the shaping of the substrate with the elements that constitute the matrix. For example, according to this preferred method of this invention, the modified zeolite according to the invention is added to a moist alumina gel during the stage for shaping the substrate.

One of the preferred methods for the shaping of the substrate in this invention consists in kneading at least one modified zeolite with a moist alumina gel for several tens of minutes, and then in running the thus obtained paste through a die for forming extrudates with a diameter of between 0.4 and 4 mm.

According to another preferred preparation method, the modified zeolite can be introduced during the synthesis of the matrix. For example, according to this preferred method of this invention, the modified zeolite is added during the synthesis of the silico-aluminum matrix; the zeolite can be added to a mixture that consists of an alumina compound in an acidic medium with a completely soluble silica compound.

The substrate can be shaped by any technique that is known to one skilled in the art. The shaping can be implemented, for example, by extrusion, by pelletizing, by the drop (oil-drop) coagulation method, by turntable granulation, or by any other method that is well known to one skilled in the art.

At least one calcination cycle can be carried out after any of the stages of the preparation. The calcination treatment is advantageously carried out in air at a temperature of at least 150° C., preferably at least 300° C., and in a more preferred manner between approximately 350 and 1,000° C.

The elements of group VIB and/or the elements of group VIII and optionally at least one dopant that is selected from among boron, silicon, and phosphorus, and optionally the elements of group IVB or IB in the case where the active phase contains reduced nickel optionally can be introduced, completely or partially, at any stage of the preparation: during the synthesis of the matrix, preferably during the shaping of the substrate, or in a very preferred manner after the shaping of the substrate by any method that is known to one skilled in the art. They can be introduced after the shaping of the substrate and after or before the drying and the calcination of the substrate.

According to a preferred method of this invention, all or part of the elements of group VIB and/or the elements of group VIII, and optionally at least one dopant that is selected from among boron, silicon and phosphorus, and optionally the elements of group IVB or IB in the case where the active phase contains reduced nickel can be introduced during the shaping of the substrate, for example during the stage for kneading the modified zeolite with a moist alumina gel.

According to another preferred method of this invention, all or part of the elements of group VIB and/or the elements of group VIII, and optionally at least one dopant that is selected from among boron, silicon, and phosphorus, and optionally the elements of group IVB or IB in the case where the active phase contains reduced nickel can be introduced by one or more operations for impregnation of the substrate that is shaped and calcined, by a solution that contains the precursors of said elements. In a preferred way, the substrate is impregnated by an aqueous solution. The impregnation of the substrate is preferably carried out by the so-called "dry" impregnation method that is well known to one skilled in the art.

In the case where the catalyst of this invention contains a non-noble metal of group VIII, the metals of group VIII are preferably introduced by one or more operations for impregnation of the substrate that is shaped and calcined, after those of group VIB or at the same time as the latter.

In the case where the catalyst of this invention contains a noble metal of group VIII, the metals of group VIII are preferably introduced by one or more operations for impregnation of the substrate that is shaped and calcined.

According to another preferred method of this invention, the deposition of the elements of group IVB or group IB can also be implemented simultaneously by using, for example, a solution that contains a tin salt or a copper salt.

According to another preferred method of this invention, the deposition of boron and silicon can also be implemented simultaneously by using, for example, a solution that contains a boron salt and a silicone-type silicon compound.

When at least one dopant, P and/or B and/or Si, is introduced, its distribution and its location can be determined by techniques such as the Castaing microprobe (distribution profile of various elements), the transmission electronic microscopy coupled to an EDX analysis (energy-dispersive analysis) of the components of the catalyst, or else also by combining distribution mapping of the elements that are present in the catalyst by electronic microprobe.

For example, among the sources of molybdenum and tungsten, it is possible to use oxides and hydroxides, the molybdic and tungstic acids, and their salts, in particular ammonium salts such as ammonium molybdate, ammonium heptamolybdate, ammonium tungstate, phosphomolybdic acid, phosphotungstic acid, and salts thereof, silicomolybdic acid, silicotungstic acid, and salts thereof. The oxides and salts of ammonium such as ammonium molybdate, ammonium heptamolybdate, and ammonium tungstate are preferably used.

The sources of non-noble elements of group VIII that can be used are well known to one skilled in the art. For example, for the non-noble metals, nitrates, sulfates, hydroxides, phosphates, halides such as, for example, chlorides, bromides and fluorides, and carboxylates, such as, for example, acetates and carbonates, will be used.

The sources of noble elements of group VIII that can advantageously be used are well known to one skilled in the am For the noble metals, halides, for example chlorides and nitrates, acids such as hexachloroplatinic acid, hydroxides, and oxychlorides such as ammoniacal ruthenium oxychloride, are used. It is also possible advantageously to use the cationic complexes such as the ammonium salts when it is desired to deposit the metal on the Y-type zeolite by cation exchange.

The noble metals of group VIII of the catalyst of this invention can advantageously be present completely or partially in metallic and/or oxide form.

The promoter element(s) selected from the group that is formed by silicon, boron and phosphorus can advantageously be introduced by one or more impregnation operations with excess solution on the calcined precursor.

The boron source can advantageously be boric acid, preferably orthohoric acid $H_3BO_3$, ammonium biborate or pentahorate, boron oxide, and boric esters. Boron can be introduced, for example, in the form of a mixture of boric acid, hydrogen peroxide, and a basic organic compound that contains nitrogen, such as ammonia, primary and secondary amines, cyclic amines, compounds of the family of pyridine, and quinolines, and the compounds of the pyrrole family. Boron can be introduced by, for example, a boric acid solution in a water/alcohol mixture. The preferred phosphorus source is the orthophosphoric acid $H_3PO_4$, but its salts and esters, such as the ammonium phosphates, are also suitable. Phosphorus can be introduced, for example, in the form of a mixture of phosphoric acid and a basic organic compound that contains nitrogen, such as ammonia, primary and secondary amines, cyclic amines, compounds of the pyridine family, and quinolines and compounds of the pyrrole family.

Numerous silicon sources can advantageously be used. Thus, it is possible to use ethyl orthosilicate $Si(OEt)_4$, siloxanes, polysiloxanes, silicones, silicone emulsions, halide silicates such as ammonium fluorosilicate $(NH4)_2SiF_6$ or sodium fluorosilicate $Na_2SiF_6$. Silicomolybdic acid and its salts and silicotungstic acid and its salts can also advantageously be used. Silicon can advantageously be added by, for example, impregnation of ethyl silicate in solution in a water/alcohol mixture. Silicon can be added by, for example, impregnation of a silicone-type silicon compound or silicic acid suspended in water.

The element sources of group IB that can be used are well known to one skilled in the art. For example, among the copper sources, it is possible to use copper nitrate $Cu(NO_3)_2$.

The element sources of group IVB that can be used are well known to one skilled in the art. For example, among tin sources, it is possible to use tin chloride $SnCl_2$.

The catalysts that are used in the process according to the invention advantageously have the shape of spheres or the form of extrudates. It is advantageous, however, that the catalyst comes in the form of extrudates with a diameter of between 0.5 and 5 mm and more particularly between 0.7 and 2.5 mm. The shapes are cylindrical (which may or may not be hollow), braided cylindrical, multilobed (2, 3, 4 or 5 lobes, for example), and rings. In a preferred manner, the cylindrical shape is used, but any other shape can be used. The catalysts according to the invention optionally can be produced and used in the form of crushed powder, tablets, rings, balls, and wheels.

Processes for Hydrocracking and/or Hydroisomerization

This invention therefore relates to a process for the production of middle distillates from a paraffinic feedstock produced by Fischer-Tropsch synthesis, implementing a hydrocracking/hydroisomerization catalyst as described above, with said process operating at a temperature of between 240 and 400° C. and preferably between 300 and 390° C., a pressure of between 1 and 9 MPa and preferably between 2 and 8 MPa, an hourly volumetric flow rate of between 0.5 and 5 $h^{-1}$ (ratio of the hourly volumetric flow rate at 15° C. of fresh liquid feedstock to the volume of charged catalyst) and preferably between 0.8 and 3 $h^{-1}$, and a hydrogen flow rate that is adjusted to obtain a ratio of 400 to 1,500 normal liters of hydrogen per liter of feedstock and preferably a ratio of 600 and 1,300 normal liters of hydrogen per liter of feedstock.

Said process can advantageously be implemented according to the following stages:
 a) A fractionation of the feedstock,
 b) An optional hydrotreatment of at least one portion of said feedstock that is obtained from fractionation,
 c) An optional stage for removal of at least one portion of the water and optionally CO, $CO_2$, $NH_3$, and $H_2S$,
 d) Running, in the process according to the invention, of at least one portion of said optionally hydrotreated fraction: the above-described conversion on the catalyst according to the invention of products with boiling points that are greater than or equal to 370° C. into products with boiling points that are less than 370° C. is greater than 40% by weight,
 e) A distillation of the hydrocracked/hydroisomerized fraction to obtain middle distillates and optionally recycling in stage d) of the residual fraction that boils above said middle distillates.

In the case where a hydrotreatment stage is implemented upstream from said process according to the invention, the hydrotreatment catalysts that are used in said stage are described in the different embodiments.

THE EMBODIMENTS ACCORDING TO THE INVENTION

Figure 1:
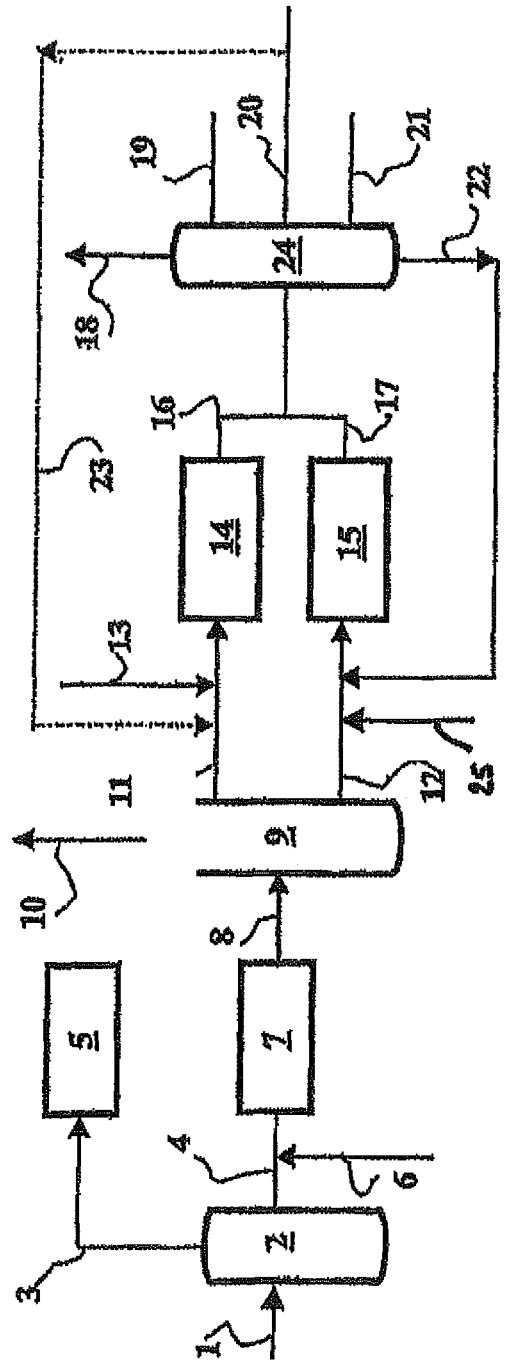
FIGS. 1-8 represent schematically the following embodiments of the invention.

Said process can advantageously be implemented according to the following different embodiments.

a) First Embodiment

According to a preferred embodiment of the invention, the process comprises the following stages starting from a feedstock that is obtained from Fischer-Tropsch synthesis:
 a) Separation of a single so-called heavy fraction with an initial boiling point that is between 120 and 200° C.,
 b) Hydrotreatment of at least one portion of said heavy fraction,
 c) Fractionation into at least three fractions:
  At least one intermediate fraction that has an initial boiling point T1 of between 120 and 200° C., and a final boiling point T2 that is greater than 300° C. and less than 410° C.,
  At least one light fraction that boils below the intermediate fraction,
  At least one heavy fraction that boils above the intermediate fraction,
 d) Running of at least one portion of said intermediate fraction over a hydroisomerizing catalyst,
 e) Running of at least one portion of said heavy fraction in the process according to the invention,
 f) Distillation of hydrocracked/hydroisomerized fractions for obtaining middle distillates and recycling of the residual fraction that boils above said middle distillates in stage (e) on the catalyst according to the invention that treats the heavy fraction.

The description of this embodiment will be given with reference to FIG. 1 without FIG. 1 limiting the interpretation.

Stage (a)

The effluent that is obtained from the Fischer-Tropsch synthesis unit that comes in via the pipe 1 is fractionated (for example by distillation) in a separation means (2) into at least two fractions: at least one light fraction and one heavy fraction with an initial boiling point that is equal to a temperature of between 120 and 200° C. and preferably between 130 and 180° C., and in an even more preferred manner at a temperature of approximately 150° C.; in other words, the fraction point is located between 0.120 and 200° C. The light fraction of FIG. 1 exits via the pipe (3), and the heavy fraction exits via the pipe (4).

This fractionation can be implemented by methods that are well known to one skilled in the art, such as flash, distillation, etc. By way of nonlimiting example, the effluent that is obtained from the Fischer-Tropsch synthesis unit will be subjected to a flash, a decanting for eliminating water, and a distillation so as to obtain at least the two fractions that are described above.

The light fraction is not treated according to the process of the invention but can constitute, for example, a good feedstock for petrochemistry and more particularly for a steam-cracking unit (5). The above-described heavy fraction is treated according to the process of the invention.

Stage (b)

At least one portion of said heavy fraction (stage a) is admitted into the presence of hydrogen (pipe 6) in a zone (7) that contains a hydrotreatment catalyst that has as its objective to reduce the content of olefinic and unsaturated compounds as well as optionally to decompose the oxidized compounds that are present in the fraction, as well as optionally to decompose possible traces of sulfur- and nitrogen-containing compounds that are present in the heavy fraction. This hydrotreatment stage is non-converting; i.e., the conversion of the 370° C.$^+$ fraction into the 370° C.$^-$ fraction is preferably less than 20% by weight, in a preferred manner less than 10% by weight, and in a very preferred manner less than 5% by weight.

The catalysts that are used in this stage (b) are non-cracking or sparingly cracking hydrotreatment catalysts that comprise at least one metal of group VIII and/or group VI of the periodic table. Preferably, the catalyst comprises at least one metal from the group of metals formed by nickel, molybdenum, tungsten, cobalt, ruthenium, iridium, palladium and platinum, and it includes at least one substrate.

It is possible to use a combination of at least one metal of group VI (in particular molybdenum or tungsten) and at least one metal of group VIII (in particular cobalt and nickel) of the periodic table. The concentration of metal of the non-noble group VIII, when the latter is used, is 0.01 to 15% by weight of equivalent relative to the finished catalyst, and that of the metal of group VI (in particular molybdenum or tungsten) is 5% to 30% by weight, in oxide equivalent, relative to the finished catalyst. When a combination of metals of group VI and group VIII is used, the catalyst is then preferably used in a sulfurized form.

Advantageously, at least one element that is selected from among P, B, and Si is deposited on the substrate.

This catalyst can advantageously contain phosphorus; actually, this compound provides two advantages to the hydrotreatment catalysts: an ease of preparation in particular during the impregnation of nickel and molybdenum solutions, and a better hydrogenation activity.

In a preferred catalyst, the total concentration of metals of groups VI and VIII, expressed in terms of metal oxides, is between 5 and 40% by weight and preferably between 7 and 30% by weight, and the ratio by weight that is expressed in terms of metal oxide (or metals) of group VI to metal (or metals) of group VIII is between 1.25 and 20 and preferably between 2 and 10. Advantageously, if there is phosphorus, the concentration of phosphorus oxide $P_2O_5$ will be less than 15% by weight and preferably less than 10% by weight.

It is also possible to use a catalyst that contains boron and phosphorus; advantageously, boron and phosphorus are promoter elements that are deposited on the substrate, and, for example, the catalyst according to the patent EP297949. The sum of the quantities of boron and phosphorus, expressed respectively in terms of weight of boron trioxide and phosphorus pentoxide, relative to the weight of the substrate, is from approximately 5 to 15%, and the atomic ratio of boron to phosphorus is from approximately 1 to 2, and at least 40% of the total pore volume of the finished catalyst is contained in pores with a mean diameter that is greater than 13 nanometers. Preferably, the quantity of metal of group VI is such that the molybdenum or tungsten is such that the atomic ratio of phosphorus to metal of group VIB is from approximately 0.5 to 1.5; the quantities of metal of group VIB and of metal of group VIII, such as nickel or cobalt, are such that the atomic ratio of metal of group VIII to metal of group VIB is from approximately 0.3 to 0.7. The quantity of metal of group VIB that is expressed in terms of weight of metal relative to the weight of finished catalyst is from approximately 2 to 30%, and the quantity of metal of group VIII that is expressed in terms of weight of metal relative to the weight of the finished catalyst is from approximately 0.01 to 15%.

Another particularly advantageous catalyst contains the promoter silicon that is deposited on the substrate. An advantageous catalyst contains BSi or PSi.

The sulfurized catalysts Ni on alumina, NiMo on alumina, NiMo on boron- and phosphorus-doped alumina, and NiMo on silica alumina are also preferred. Advantageously, eta-alumina or gamma-alumina will be selected as a substrate.

In the case of the use of noble metals (platinum and/or palladium), the metal content is preferably between 0.05 and 3% by weight relative to the finished catalyst and preferably between 0.1 and 2% by weight of the finished catalyst. The noble metal is preferably used in its reduced and non-sulfurized form. It is also possible to use a catalyst that is based on reduced and non-sulfurized nickel. In this case, the content of metal in its oxide form is between 0.5 and 25% by weight relative to the finished catalyst. Preferably, the catalyst also contains a metal of group IB such as copper, in proportions such that the ratio by mass of the metal of group IB and nickel to the catalyst is between 0.03 and 1.

These metals are deposited on a substrate that is preferably an alumina, but that can also be boron oxide, magnesia, zirconia, titanium oxide, a clay or a combination of these oxides. These catalysts can be prepared by all of the methods that are known to one skilled in the art or else can be acquired from companies that specialize in the production and sale of catalysts.

In the hydrotreatment reactor (7), the feedstock is brought into contact with the catalyst in the presence of hydrogen at operating temperatures and pressures that make it possible to implement the hydrogenation of olefins that are present in the feedstock. In a preferred manner, the catalyst and the operating conditions that are selected will also make it possible to carry out hydrodeoxygenation, i.e., the decomposition of the oxidized compounds (primarily alcohols) and/or hydrodesulfurization or hydrodenitration of the possible traces of sulfur- and/or nitrogen-containing compounds that are present in the feedstock. The reaction temperatures that are used in the hydrotreatment reactor are between 100 and 400° C., preferably between 150 and 350° C., and even more preferably between 150 and 300° C. The range of total pressure used varies from 0.5 to 1.5 MPa, preferably between 1 and 10 MPa, and in an even more preferred manner between 1 and 9 MPa. The hydrogen that supplies the hydrotreatment reactor is introduced at a flow rate such that the hydrogen/hydrocarbon volumetric ratio is between 50 to 3,000 normal liters per liter, preferably between 100 and 2,000 normal liters per liter, and even more preferably between 1.50 and 1,500 normal liters per liter. The flow rate of feedstock is such that the hourly volumetric flow rate is between 0.1 and 10 $h^{-1}$, preferably between 0.2 and 5 $h^1$, and in an even more preferred manner between 0.2 and 3 $h^{-1}$. Under these conditions, the content of unsaturated and oxidized molecules is reduced to less than 0.5% by weight and to approximately less than 0.1% by weight in general. The hydrotreatment stage is conducted under conditions such that the conversion of products that have boiling points of greater than or equal to 370° C. into products that have boiling points of less than 370° C. is limited to 20% by weight, preferably is less than 10% by weight, and in an even more preferred way is less than 5% by weight.

Stage (c)

The effluent that is obtained from the hydrotreatment reactor is brought via a pipe (8) into a fractionation zone (9) where it is fractionated into at least three fractions:

At least one light fraction (exiting via the pipe 10) of which the compounds have boiling points that are less than a temperature T1 that is between 120 and 200° C., and preferably between 130 and 180° C., and in an even more preferred manner at a temperature of approximately 150° C. In other words, the fraction point is between 120 and 200° C.;

At least one intermediate fraction (pipe 11) that comprises the compounds of which the boiling points are between the fraction point T1, defined above, and a temperature T2 that is greater than 300° C., in an even more preferred manner greater than 350° C. and less than 410° C. or, better, less than 370° C.;

At least one so-called heavy fraction (pipe 12) that comprises the compounds that have boiling points that are greater than the fraction point T2 defined above.

Stage (d)

At least one portion of said intermediate fraction is then introduced (pipe 11) as well as optionally a hydrogen stream (pipe 13) into the zone (14) that contains a hydroisomerization catalyst.

The operating conditions in which this stage (d) is carried out are as follows.

The pressure is maintained between 0.2 and 15 MPa and preferably between 0.5 and 10 MPa, and advantageously from 1 to 9 MPa; the hourly volumetric flow rate is between $0.1\ h^{-1}$ and $10\ h^{-1}$ and preferably between 0.2 and $7\ h^{-1}$ and advantageously between 0.5 and $5.0\ h^{-1}$. The flow rate of hydrogen is adjusted to obtain a ratio of 100 to 2,000 normal liters of hydrogen per liter of feedstock and preferably between 150 and 1,500 liters of hydrogen per liter of feedstock. The temperature that is used in this stage is between 200 and 450° C. and preferably from 250° C. to 450° C., advantageously from 300 to 450° C., and even more advantageously greater than 320° C. or, for example, between 320 and 420° C.

The hydroisomerization stage (d) is advantageously conducted under conditions such that the conversion per pass of products with boiling points of greater than or equal to 150° C. into products that have boiling points of less than 150° C. is the lowest possible, preferably less than 50% by weight, in an even more preferred manner less than 30% by weight, and in a very preferred manner less than 15% by weight, and it makes it possible to obtain middle distillates (gas oil and kerosene) that have cold properties (pour point and freezing point) that are good enough to satisfy the specifications in force for this type of fuel.

Thus, in this stage (d), it is desired to promote hydroisomerization rather than hydrocracking. The catalysts that are used are of the bifunctional type, i.e., they have a hydro/dehydrogenating function and a hydroisomerizing function. The hydro/dehydrogenating function is generally provided either by active noble metals (Pt and/or Pd) in their reduced form or by non-noble metals of group VI (particularly molybdenum and tungsten) in combination with non-noble metals of group VIII (particularly nickel and cobalt), preferably used in their sulfurized form. The hydroisomerizing function is ensured by acidic solids, such as zeolites, halogenated aluminas, pillar clays, heteropolyacids, or sulfated zirconia. An alumina-type binder can also be used during the stage for shaping the catalyst. The metallic function can be introduced onto the catalyst by any method that is known to one skilled in the art, such as, for example, co-mixing, dry impregnation, and exchange impregnation.

In the case where the hydroisomerization catalyst comprises at least one noble metal of group VIII, the content of noble metal is advantageously between 0.01 and 5% by weight relative to the finished catalyst, in a preferred manner between 0.1 and 4% by weight, and in a very preferred manner between 0.2 and 2% by weight. Before use in the reaction, the noble metal that is contained in the catalyst is to be reduced. One of the preferred methods for conducting the reduction of metal is the treatment under hydrogen at a temperature of between 150° C. and 650° C. and a total pressure of between 0.1 and 25 MPa. For example, a reduction consists of a plateau level for two hours at 150° C. and then an increase in temperature up to 450° C. at the rate of 1° C./minute, and then a plateau level for two hours at 450° C.; during this entire reduction stage, the hydrogen flow rate is 1,000 normal liters of hydrogen/liter of catalyst, and the total pressure is kept constant at 0.1 MPa. We note also that any ex-situ reduction method is suitable.

In the case where the hydroisomerization catalyst comprises at least one metal of group VI in combination with at least one non-noble metal of group VIII, the metal content of group VI of the hydroisomerization catalyst is advantageously, in oxide equivalent, between 5 and 40% by weight relative to the finished catalyst, in a preferred manner between 10 and 35% by weight, and in a very preferred manner between 15 and 30% by weight, and the metal content of group VIII of said catalyst is advantageously, in oxide equivalent, between 0.5 and 10% by weight relative to the finished catalyst, in a preferred manner between 1 and 8% by weight, and in a very preferred manner between 1.5 and 6% by weight. Before use in the reaction, the metals of group VI and non-noble metals of group VIII should be sulfurized. Any method of in-situ or ex-situ sulfurization that is known to one skilled in the art is suitable.

The metal hydro/dehydrogenating function can advantageously be introduced onto said catalyst by any method that is known to one skilled in the art, such as, for example, co-mixing, dry impregnation, or exchange impregnation.

According to stage (d) for hydroisomerization of the process according to the invention, the hydroisomerization catalyst comprises at least one molecular sieve, preferably at least one zeolitic molecular sieve, and in a more preferred manner, at least one mono-dimensional 10 MR zeolitic molecular sieve, as a hydroisomerizing function.

The zeolitic molecular sieves are defined in the classification "Atlas of Zeolite Structure Types," W. M. Meier, D. H. Olson and Ch. Baerlocher, $5^{th}$ Revised Edition, 2001, Elsevier to which this application also refers. The zeolites are classified there according to the size of their pore openings or channels.

The mono-dimensional 10 MR zeolitic molecular sieves have pores or channels of which the opening is defined by a ring with 10 oxygen atoms (10 MR opening). The channels of the zeolitic molecular sieve that have a 10 MR opening are advantageously non-interconnected, mono-dimensional channels that empty directly into the outside of said zeolite.

The mono-dimensional 10 MR zeolitic molecular sieves that are present in said hydroisomerization catalyst advantageously comprise silicon and at least one element T that is selected from the group that is formed by aluminum, iron, gallium, phosphorus and boron, preferably aluminum. The Si/Al ratios of the zeolites that are described above are advantageously those that are obtained with synthesis or else obtained after post-synthesis dealuminification treatments that are well known to one skilled in the art, such as, and in a non-exhaustive manner, hydrothermal treatments that may or may not be followed by acid attacks or else the direct acid attacks by mineral or organic acid solutions. They are preferably virtually entirely in acidic form, i.e., the atomic ratio between the monovalent compensation cation (for example, sodium) and the element T that is inserted in the crystalline lattice of the solid is advantageously less than 0.1, preferably less than 0.05, and in a very preferred manner less than 0.01. Thus, the zeolites that enter into the composition of said selective hydroisomerization catalyst are advantageously calcined and exchanged by at least one treatment by a solution of at least one ammonium salt so as to obtain the ammonium form of zeolites that, once calcined, lead to the acidic form of said zeolites.

Said mono-dimensional 10 MR zeolitic molecular sieve of said hydroisomerization catalyst is advantageously selected from among the TON-structural-type zeolitic molecular sieves (selected from among ZSM-22 and NU-10, taken by itself or in a mixture), FER (selected from among ZSM-35 and ferrierite, taken by itself or in a mixture), EUO (selected from among EU-1 and ZSM-50, taken by itself or in a mixture), SAPO-11, or the zeolitic molecular sieves ZBM-30 or ZSM-48, taken by itself or in a mixture. Preferably, said mono-dimensional 10 MR zeolitic molecular sieve is selected from among the zeolitic molecular sieves ZBM-30, NU-10 and ZSM-22, taken by itself or in a mixture. In a very preferred manner, said mono-dimensional 10 MR zeolitic molecular sieve is ZBM-30 that is synthesized with the organic structuring agent triethylenetetramine. Actually, the use of said ZBM-30 produces better results in terms of isomerization and activity yield than the other zeolites and in particular than ZSM-48.

The mono-dimensional 10 MR zeolitic molecular sieve content is advantageously between 5 and 95% by weight, preferably between 10 and 90% by weight, in a more preferred manner between 15 and 85% by weight, and in a very preferred manner between 20 and 80% by weight relative to the finished catalyst. The catalysts that are obtained are shaped in the form of grains of different shapes and sizes. They are used in general in the form of extrudates that are cylindrical or multilobed, such as bilobed, trilobed, multilobed of straight or twisted shape, but they can optionally be produced and used in the form of crushed powders, tablets, rings, balls and wheels. The shaping can be implemented with matrices other than alumina, such as, for example, magnesia, amorphous silica aluminas, natural clays (kaolin, bentonite, sepiolite, attapulgite), silica, titanium oxide, boron oxide, zirconia, aluminum phosphates, titanium phosphates, zirconium phosphates, carbon and mixtures thereof. It is preferred to use matrices that contain alumina in all of its forms known to one skilled in the art and, in an even more preferred manner, aluminas, for example, gamma-alumina. Techniques other than extrusion, such as pelletizing or tabletting, can be used.

Stage (e)

At least one portion of said heavy fraction is introduced via line (12) into a zone (15) where it is brought, in the presence of hydrogen (25), into contact with a catalyst that is employed in the process according to this invention and under the operating conditions of the process of this invention so as to produce a middle distillate fraction (kerosene and gas oil) that has good cold properties.

The catalyst that is used in zone (15) of stage (e) for implementing the reactions for hydrocracking and hydroisomerization of the heavy fraction is the catalyst that is defined in the first part of the patent application. During this stage (e), the fraction that enters into the reactor undergoes—upon contact with the catalyst and in the presence of hydrogen—essentially hydrocracking reactions that, accompanied by hydroisomerization reactions of n-paraffins, will make it possible to improve the quality of products that are formed and more particularly the cold properties of kerosene and gas oil, and also to obtain very good middle distillate yields. The conversion of products having boiling points that are greater than or equal to 370° C. into products with boiling points that are less than 370° C. is greater than 50% by weight, often at least 60%, and preferably greater than or equal to 70%.

Stage (f)

The effluents at the outlet of reactors (14) and (15) are sent via the pipes (16) and (17) into a distillation train that integrates an atmospheric distillation and optionally a vacuum distillation and that has as its object to separate, on the one hand, the light products that are inevitably formed during stages (d) and (e), for example the gases ($C_1$-$C_4$) (pipe 18) and a gasoline fraction (pipe 19), and to distill at least one gas oil fraction (pipe 21) and one kerosene fraction (pipe 20). The gas oil and kerosene fractions can be partially recycled (pipe 23), jointly or separately, at the top of the reactor (14) for hydroisomerization of stage (d).

A fraction (pipe 22) that boils above the gas oil, i.e., whose compounds that constitute it have boiling points that are greater than those of the middle distillates (kerosene and gas oil), is also distilled. This fraction, called a residual fraction, generally has an initial boiling point of at least 350° C., preferably greater than 370° C. This fraction is advantageously recycled via the pipe (22) at the top of the reactor (15) for hydroisomerization and hydrocracking of the heavy fraction (stage e).

It may also be advantageous to recycle a portion of the kerosene and/or gas oil in stage (d), stage (e), or both. Preferably, at least one of the kerosene and/or gas oil fractions is partially recycled in stage (d) (zone 14). It was possible to note that it is advantageous to recycle a portion of the kerosene to improve its cold properties.

Advantageously, and in the same step, the non-hydrocracked fraction is partially recycled in stage (e) (zone 15):

It goes without saying that the gas oil and kerosene fractions are preferably recovered separately, but the fraction points are adjusted by the user based on his needs.

FIG. 1 shows one distillation column (24), but two columns can be used to treat the fractions obtained from zones (14) and (15) separately.

FIG. 1 shows only the recycling of kerosene on the catalyst of reactor (14). It goes without saying that it is also possible to recycle a portion of the gas oil (separately or with kerosene) and preferably on the same catalyst as kerosene.

b) Second Embodiment

Another embodiment of the invention comprises the following stages:
a) Separation of at least one light fraction from the feedstock so as to obtain a single so-called heavy fraction with an initial boiling point of between 120 and 200° C.,
b) Hydrotreatment of said heavy fraction, followed by a stage, c) For removal of at least one portion of the water and CO, $CO_2$, $NH_3$, and $H_2S$,
d) Running, in the process according to the invention, of at least one portion of said optionally hydrotreated fraction, the conversion on the catalyst according to the above-described invention of products with boiling points that are greater than or equal to 370° C. into products with boiling points that are less than 370° C. is greater than 40% by weight,
e) Distillation of the hydrocracked/hydroisomerized fraction for obtaining middle distillates, and optional recycling in stage d) of the residual fraction that boils above said middle distillates.

Figure 2:
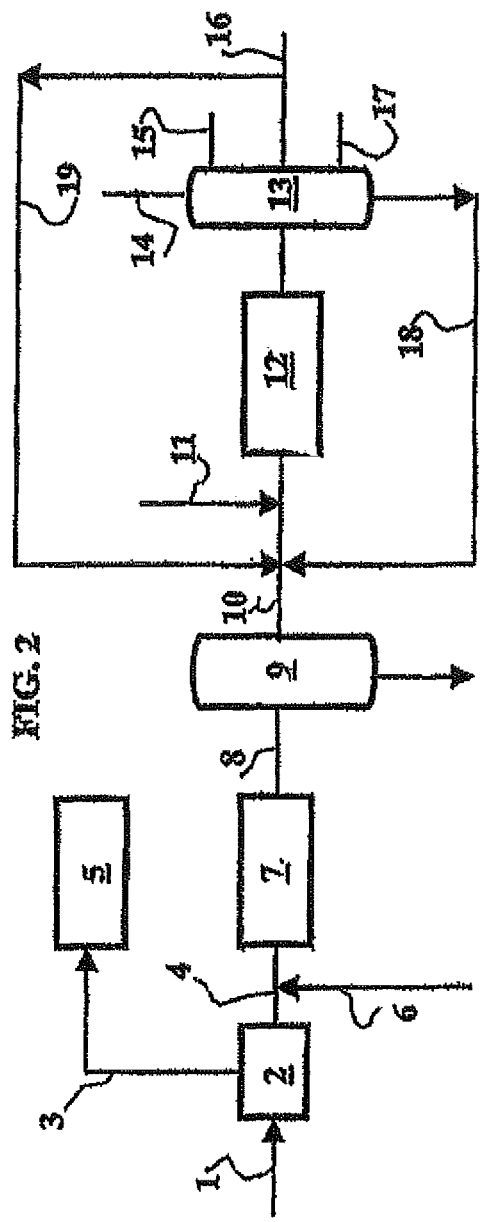

The description of this embodiment will be given with reference to FIG. 2 without FIG. 2 limiting the interpretation.

Stage (a)

The effluent that is obtained from the Fischer-Tropsch synthesis unit that comes in via the pipe 1 is fractionated (for example by distillation) in a separation means (2) into at least two fractions: at least one light fraction and one heavy fraction with an initial boiling point that is equal to a temperature that is between 120 and 200° C., and preferably between 130 and 180° C., and in an even more preferred manner at a temperature of approximately 150° C.; in other words, the fraction point is located between 120 and 200° C. The light fraction of FIG. 1 exits via the pipe (3), and the heavy fraction exits via the pipe (4).

This fractionation can be implemented by methods that are well known to one skilled in the art, such as flash, distillation, etc. By way of nonlimiting example, the effluent that is obtained from the Fischer-Tropsch synthesis unit will be subjected to a flash, a decanting for eliminating water, and a distillation so as to obtain at least the two fractions that are described above.

The light fraction is not treated according to the process of the invention but can, for example, constitute a good feedstock for petrochemistry and more particularly for a steam-cracking unit (5). The heavy fraction described above is treated according to the process of the invention.

Stage (b)

This fraction is admitted into the presence of hydrogen (pipe 6) in a zone (7) that contains a catalyst for hydrotreatment that has as its objective to reduce the content of olefinic and unsaturated compounds as well as to decompose the oxidized compounds (primarily alcohols) that are present in the heavy fraction described above, as well as to decompose possible traces of sulfur- and nitrogen-containing compounds that are present in the heavy fraction. This hydrotreatment stage is non-converting; i.e., the conversion of the 370° C.$^+$ fraction into the 370° C.$^-$ fraction is preferably less than 20% by weight, in a preferred manner less than 10% by weight, and in a very preferred manner less than 5% by weight.

The catalysts that are used in this stage (b) are hydrotreatment catalysts that are described in stage (b) of the first embodiment.

In the hydrotreatment reactor (7), the feedstock is brought into contact in the presence of hydrogen and the catalyst at operating temperatures and pressures that make it possible to implement the hydrogenation of olefins that are present in the feedstock. In a preferred manner, the catalyst and the operating conditions that are selected will also make it possible to carry out hydrodeoxygenation, i.e., the decomposition of the oxidized compounds (primarily alcohols) and/or hydrodesulfurization or hydrodenitration of the possible traces of sulfur- and/or nitrogen-containing compounds that are present in the feedstock. The reaction temperatures that are used in the hydrotreatment reactor are between 100 and 400° C., preferably between 150 and 350° C., and even more preferably between 150 and 300° C. The total pressure range that is used varies from 0.5 to 15 MPa, preferably between 1 and 10 MPa, and in an even more preferred manner between 1 and 9 MPa. The hydrogen that supplies the hydrotreatment reactor is introduced at a flow rate such that the hydrogen/hydrocarbon volumetric flow rate is between 50 to 3,000 normal liters per liter, preferably between 100 and 2,000 normal liters per liter, and even more preferably between 150 and 1,500 normal liters per liter. The feedstock flow rate is such that the hourly volumetric flow rate is between 0.1 and 10 $h^{-1}$, preferably between 0.2 and 5 $h^{-1}$, and in an even more preferred manner between 0.2 and 3 $h^{-1}$. Under these conditions, the content of unsaturated and oxidized molecules is reduced to less than 0.5% by weight and to approximately less than 0.1% by weight in general. The hydrotreatment stage is conducted under conditions such that the conversion of products having boiling points of greater than or equal to 370° C. into products that have boiling points that are less than 370° C. is limited to 20% by weight, preferably is less than 10% by weight, and even more preferably is less than 5% by weight.

Stage (c)

The effluent (pipe 8) that is obtained from the hydrotreatment reactor (7) is then introduced into a water removal zone (9) whose purpose is to eliminate at least partially the water that is produced during hydrotreatment reactions. This elimination of water can be carried out with or without elimination of the gaseous $C_4^-$ fraction, which is generally produced during the hydrotreatment stage. Elimination of water is defined as the elimination of the water that is produced by the reactions for hydrodeoxygenation of oxidized elements, but it is also possible to include the at least partial elimination of the water for saturation of hydrocarbons. The elimination of water can be implemented by all of the methods and techniques that are known to one skilled in the art, for example by drying, by being run over a desiccant, flash, decanting, . . . .

Stage (d)

The thus dried hydrotreated heavy fraction is then introduced (pipe 10), as well as optionally a hydrogen stream (pipe 11), into the zone (12) that contains the catalyst that is employed in the process according to the invention and under the operating conditions of the process of this invention. Another possibility of the process also according to the invention consists in sending all of the effluent that is exiting from the hydrotreatment reactor (without drying) into the reactor that contains the catalyst according to the invention and preferably at the same time as a hydrogen stream. The catalyst that is used for implementing the reactions for hydrocracking and hydroisomerization of the heavy fraction is the catalyst that is defined in the first portion of the patent application.

The operating conditions in which this stage (d) is carried out are the operating conditions that are described according to the process of the invention.

The stage for hydroisomerization and hydrocracking is conducted under conditions such that the conversion per pass of products with boiling points of greater than or equal to 370° C. into products that have boiling points of less than 370° C. is greater than 40% by weight, and even more preferably greater than at least 50%, preferably greater than 60% by weight, so as to obtain middle distillates (gas oil and kerosene) that have cold properties (pour point and freezing point) that are good enough to satisfy the specifications in force for this type of fuel.

Stage (e)

The effluent (so-called hydrocracked and hydroisomerized fraction) at the outlet of the reactor (12), stage (d), is sent into a distillation train (13) that integrates an atmospheric distillation and optionally a vacuum distillation, which has the object of separating the conversion products with a boiling point of less than 340° C. and preferably less than 370° C. and including in particular those formed during stage (d) in the reactor (12) and separating the residual fraction whose initial boiling point is generally greater than at least 340° C. and preferably greater than or equal to at least 370° C. Among the conversion products, in addition to the $C_1$-$C_4$ light gases (pipe 14), at least one gasoline fraction (pipe 15) and at least one kerosene middle distillate fraction (pipe 16) and at least one gas oil middle distillate fraction (pipe 17) are separated. The residual fraction whose initial boiling point is generally greater than at least 340° C. and preferably greater than or equal to at least 370° C. is recycled (pipe 18) at the top of the reactor (12) for hydroisomerization and hydrocracking.

It can also be advantageous to recycle (pipe 19) in the stage (d) (reactor 12) a portion of the kerosene and/or gas oil that is/are thus obtained.

c) Third Embodiment

Another embodiment of the invention comprises the following stages:
a) Fractionation of the feedstock into at least three fractions:
   At least one intermediate fraction that has an initial boiling point T1 of between 120 and 200° C., and a final boiling point T2 that is greater than 300° C. and less than 410° C.,
   At least one light fraction that boils below the intermediate fraction,
   At least one heavy fraction that boils above the intermediate fraction,
b) Hydrotreatment of at least one portion of said intermediate fraction, and then
c) Elimination of at least one portion of the water that is produced during hydrotreatment reactions and optionally CO, $CO_2$, $NH_3$, and $H_2S$,
d) Running of at least one portion of the hydrotreated fraction over a hydroisomerizing catalyst,
e) Running, in the process according to the invention, of at least one portion of said heavy fraction with a conversion of the 370° C.$^+$ products into 370° C.$^-$ products that is greater than 40% by weight,
f) Distillation of at least one portion of the hydrocracked/hydroisomerized fractions for obtaining middle distillates.

The description of this embodiment will be given with reference to FIG. 3 without FIG. 3 limiting the interpretation.
Stage (a)

The effluent that is obtained from the Fischer-Tropsch synthesis unit for the most part comprises paraffins, but it also contains olefins and oxidized compounds such as alcohols. It also contains water, $CO_2$, CO, and unreacted hydrogen as well as $C_1$ to $C_4$ light hydrocarbon compounds in gas form, and even optionally sulfur- or nitrogen-containing impurities. The effluent that is obtained from the Fischer-Tropsch synthesis unit that comes via the pipe (1) is fractionated in a fractionation zone (2) into at least three fractions:
   At least one light fraction (exiting via the pipe 3) whose constituent compounds have boiling points that are less than a temperature T1 of between 120 and 200° C., and preferably between 130 and 180° C., and in an even more preferred manner at a temperature of approximately 150° C. In other words, the fraction point is located between 120 and 200° C.,
   At least one intermediate fraction (pipe 4) that comprises the compounds whose boiling points are between the fraction point T1, defined above, and a temperature T2 that is greater than 300° C., in an even more preferred manner greater than 350° C. and less than 410° C. or, better, less than 370° C.,
   At least one so-called heavy fraction (pipe 5) that comprises the compounds that have boiling points that are greater than the fraction point 12 defined above.

The cutting at 370° C. makes it possible to separate at least 90% by weight of oxidized elements and olefins, and most often at least 95% by weight. The heavy fraction that is to be treated is then purified, and an elimination of heteroatoms or unsaturated elements by hydrotreatment is then not necessary.

The fractionation is achieved here by distillation, but it can be implemented in one or more stages and by means other than distillation.

This fractionation can be implemented by methods that are well known to one skilled in the art, such as flash, distillation, etc. By way of nonlimiting example, the effluent that is obtained from the Fischer-Tropsch synthesis unit will be subjected to a flash, a decanting for eliminating water, and a distillation so as to obtain at least the three fractions described above.

The light fraction is not treated according to the process of the invention but can constitute, for example, a good feedstock for a petrochemical unit and more particularly for a steam-cracking device (steam-cracking installation 6).

The heavier fractions described above are treated according to the process of the invention.
Stage (b)

Said intermediate fraction is admitted via the line (4) into the presence of hydrogen brought in via the pipe (7) into a hydrotreatment zone (8) that contains a hydrotreatment catalyst, whose objective is to reduce the content of olefinic and unsaturated compounds as well as optionally to decompose the oxidized compounds (primarily alcohols) that are present in the intermediate fraction described above, as well as optionally to decompose possible traces of sulfur- and nitrogen-containing compounds that are present in the intermediate fraction. This hydrotreatment stage is non-converting; i.e., the conversion of the 150° C.$^+$ fraction into the 150° C.$^-$ fraction is preferably less than 20% by weight, in a preferred manner less than 10% by weight, and in a very preferred manner less than 5% by weight.

The catalysts that are used in this stage (b) are hydrotreatment catalysts that are described in stage (b) of the first embodiment.

In the hydrotreatment reactor (8), the feedstock is brought into contact with the catalyst in the presence of hydrogen and at operating temperatures and pressures that make it possible to implement the hydrogenation of olefins that are present in the feedstock. In a preferred manner, the catalyst and the operating conditions that are selected will also make it possible to carry out the hydrodeoxygenation, i.e., the decomposition of oxidized compounds (primarily alcohols) and/or the hydrodesulfurization and/or hydrodenitration of possible traces of sulfur- and/or nitrogen-containing compounds that are present in the feedstock. The reaction temperatures that are used in the hydrotreatment reactor are between 100 and 400° C., preferably between 150 and 350° C. and even more preferably between 150 and 300° C. The total pressure range that is used varies between 0.5 and 15 MPa, preferably between 1 and 10 MPa, and in an even more preferred manner between 1 and 9 MPa. The hydrogen that supplies the hydrotreatment reactor is introduced at a flow rate such that the hydrogen/hydro-carbon volumetric ratio is between 50 and 3,000 normal liters per liter, preferably between 100 and 2,000 normal liters per liter, and even more preferably between 150 and 1,500 normal liters per liter. The feedstock flow rate is such that the hourly volumetric flow rate is between 0.1 and 10 h$^{-1}$, preferably between 0.2 and 5 h$^{-1}$, and in an even more preferred manner between 0.2 and 3 h$^{-1}$. Under these conditions, the content of unsaturated and oxidized molecules is reduced to less than 0.5% by weight and to approximately less than 0.1% by weight in general. The hydrotreatment stage is conducted under conditions such that the conversion of products that have boiling points that are greater than or equal to 150° C. into products that have boiling points that are less than 150° C. is limited to 20% by weight, preferably is less than 10% by weight, and even more preferably is less than 5% by weight.

Stage (c)

The effluent that is obtained from the hydrotreatment reactor is optionally introduced into a water removal zone (9) whose purpose is to eliminate at least one portion of the water that is produced during hydrotreatment reactions. This elimination of water can be carried out with or without elimination of the gaseous $C_4^-$ fraction, which is generally produced during the hydrotreatment stage. Elimination of water is defined as the elimination of the water that is produced by the reactions for hydrodeoxygenation of oxidized elements, but it is also possible to include the at least partial elimination of the water for saturation of hydrocarbons. The elimination of water can be implemented by all of the methods and techniques that are known to one skilled in the art, for example by drying, by being run over a desiccant, flash, decanting, . . . .

Stage (d)

The fraction that is thus optionally dried is then introduced (pipe 10), as well as optionally a hydrogen stream (pipe 11), into the zone (12) that contains a hydroisomerizing catalyst. Another possibility of the process also according to the invention consists in sending all of the effluent that exits from the hydrotreatment reactor (without drying) into the reactor that contains the hydroisomerizing catalyst and preferably at the same time as a hydrogen stream.

The hydroisomerizing catalysts are as described in stage (d) of the first embodiment.

The operating conditions in which this stage (d) is carried out are as follows. The pressure is maintained between 0.2 and 15 MPa, and preferably between 0.5 and 10 MPa, and advantageously between 1 and 9 MPa; the hourly volumetric flow rate is between 0.1 h$^{-1}$ and 10 h$^{-1}$, and preferably between 0.2 and 7 h$^{-1}$, and advantageously between 0.5 and 5.0 h$^{-1}$. The flow rate of hydrogen is adjusted to obtain a ratio of 100 to 2,000 normal liters of hydrogen per liter of feedstock and preferably between 150 and 1,500 normal liters of hydrogen per liter of feedstock. The temperature that is used in this stage is between 200 and 450° C. and preferably from 250° C. to 450° C., advantageously from 300 to 450° C., and even more advantageously greater than 320° C. or, for example, between 320 and 420° C.

The hydroisomerization stage (d) is advantageously conducted under conditions such that the conversion per pass of products with boiling points that are greater than or equal to 150° C. into products that have boiling points of less than 150° C. is the lowest possible, preferably less than 50% by weight, in an even more preferred manner less than 30%, and it makes it possible to obtain middle distillates (gas oil and kerosene) that have cold properties (pour point and freezing point) that are good enough to satisfy the specifications in force for this type of fuel.

Thus, in this stage (d), it is desired to promote hydroisomerization rather than hydrocracking.

Stage (e)

Said heavy fraction whose boiling points are greater than the fraction point T2, defined above, is introduced via line (5) into a zone (13) where it is brought, in the presence of hydrogen (26), into contact with a catalyst according to the invention and under the operating conditions of the process of this invention so as to produce a middle distillate fraction (kerosene and gas oil) that has good cold properties.

The catalyst that is used in zone (13) of stage (e) for implementing the reactions for hydrocracking and hydroisomerization of the heavy fraction is the catalyst that is defined in the first part of the patent application. During this stage (e), the fraction that enters into the reactor undergoes—upon contact with the catalyst and in the presence of hydrogen—essentially hydrocracking reactions that, accompanied by hydroisomerization reactions of n-paraffins, will make it possible to improve the quality of products that are formed and more particularly the cold properties of kerosene and gas oil, and also to obtain very good middle distillate yields. The conversion of products having boiling points that are greater than or equal to 370° C. into products with boiling points that are less than 370° C. is greater than 40% by weight, often at least 50% by weight, and preferably greater than or equal to 60% by weight.

In this stage (e), it will therefore be desired to promote hydrocracking, but preferably by limiting the cracking of middle distillates.

The selection of operating conditions makes it possible to finely adjust the quality of products (gas oil, kerosene) and in particular the cold properties of kerosene, while preserving a good yield of gas oil and/or kerosene. The process according to the invention makes it possible, in a completely advantageous way, to produce both kerosene and gas oil that are of good quality while minimizing the production of undesirable lighter fractions (naphtha, GPL).

Stage (f)

The effluent at the outlet of the reactor (12), stage (d), is sent into a distillation train that integrates an atmospheric distillation and optionally a vacuum distillation, and that has as its object to separate, on the one hand, the light products that are inevitably formed during stage (d), for example the gases ($C_1$-$C_4$) (pipe 14) and a gasoline fraction (pipe 15), and to distill at least one gas oil fraction (pipe 17) and one kerosene fraction (pipe 16). The gas oil and kerosene fractions can be partially recycled (pipe 25), jointly or separately, at the top of the reactor (12) for hydroisomerization of stage (d).

The effluent at the outlet of stage (e) is subjected to a separation stage in a distillation train so as to separate, on the one hand, the light products that are inevitably formed during stage (e), for example the gases ($C_1$-$C_4$) (pipe 18), and a gasoline fraction (pipe 19), to distill a gas oil fraction (pipe 21) and a kerosene fraction (pipe 20), and to distill the fraction (pipe 22) that boils above the gas oil, i.e., whose compounds that constitute it have boiling points that are greater than those of the middle distillates (kerosene+gas oil). This fraction, called a residual fraction, generally has an initial boiling point of at least 350° C., preferably greater than 370° C. This non-hydrocracked fraction is advantageously recycled at the top of the reactor (13) for hydroisomerization and hydrocracking of stage (e).

It may also be advantageous to recycle a portion of the kerosene and/or gas oil in stage (d), stage (f), or both. Preferably, at least one of the kerosene and/or gas oil fractions is partially recycled (pipe 25) in stage (d) (zone 12). It was possible to note that it is advantageous to recycle a portion of the kerosene to improve its cold properties.

Advantageously, and in the same step, the non-hydrocracked fraction is partially recycled in stage (f) (zone 13).

It goes without saying that the gas oil and kerosene fractions are preferably recovered separately, but the fraction points are adjusted by the user based on his needs.

Figure 3:
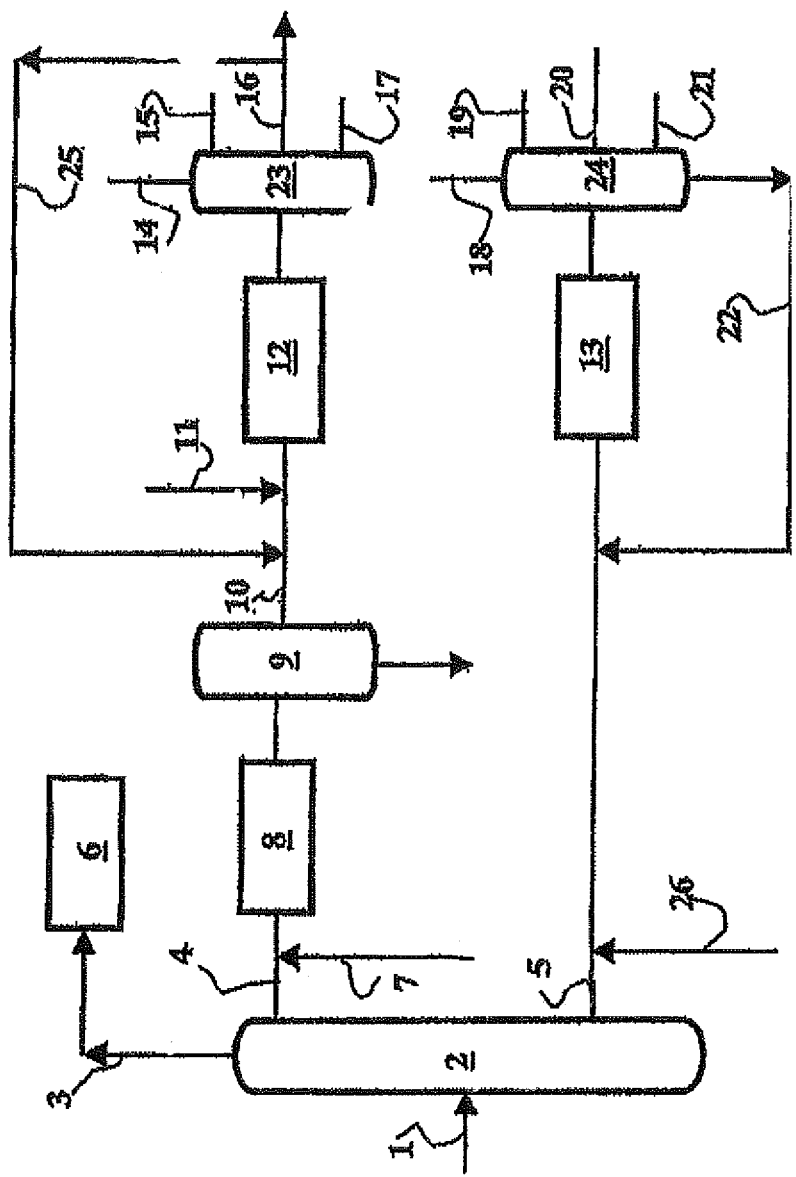

FIG. 3 shows two distillation columns (23) and (24), but a single column can be used to treat all of the fractions that are obtained from zones (12) and (13).

FIG. 3 shows only the recycling of the kerosene on the catalyst of the reactor (12). It goes without saying that it is also possible to recycle a portion of the gas oil (separately or with kerosene) and preferably on the same catalyst as the kerosene. It is also possible to recycle a portion of the kerosene and/or the gas oil produced in the lines (20) and (21).

d) Fourth Embodiment

Another embodiment of the invention comprises the following stages:
  a) Optional fractionation of the feedstock into at least one heavy fraction with an initial boiling point that is between 120 and 200° C., and at least one light fraction that boils below said heavy fraction,
  b) Optional hydrotreatment of at least one portion of the feedstock or the heavy fraction, optionally followed by
  c) The elimination of at leash one portion of the water,
  d) Running of at least one portion of the effluent or the optionally hydrotreated fraction in the process according to the invention over a first catalyst according to the invention,
  e) Distillation of the hydroisomerized and hydrocracked effluent to obtain middle distillates (kerosene, gas oil) and a residual fraction that boils above the middle distillates,
  f) Running of at least one portion of said residual heavy fraction and/or a portion of said middle distillates in the process according to the invention over a second catalyst according to the invention, and distillation of the resulting effluent for obtaining middle distillates.

The description of this embodiment will be given with reference to FIGS. 4 and 5, without these figures limiting the interpretation.
Stage (a)
When this stage is implemented, the effluent that is obtained from the Fischer-Tropsch synthesis unit is fractionated (for example by distillation) into at least two fractions: at least one light fraction and at least one heavy fraction with an initial boiling point that is equal to a temperature of between 120 and 200° C., and preferably between 130 and 180° C., and in an even more preferred manner at a temperature of approximately 150° C.; in other words, the fraction point is located between 120 and 200° C.

The heavy fraction generally has paraffin contents of at least 50% by weight.

This fractionation can be implemented by methods that are well known to one Skilled in the art such as flash, distillation, etc. By way of nonlimiting example, the effluent that is obtained from the Fischer-Tropsch synthesis unit will be subjected to a flash, a decanting for eliminating water, and a distillation so as to obtain at least the two fractions described above.

The light fraction is not treated according to the process of the invention but can constitute, for example, a good feedstock for petrochemistry and more particularly for a steam-cracking unit. At least one heavy fraction described above is treated according to the process of the invention.
Stage (b)
Optionally, this fraction, or at least one portion of the starting feedstock, is admitted via the line (1) in the presence of hydrogen (brought in by the pipe (2)) into a zone (3) that contains a hydrotreatment catalyst whose objective is to reduce the content of olefinic and unsaturated compounds as well as optionally to decompose the oxidized compounds (primarily alcohols) that are present in the heavy fraction that is described above, as well as optionally to decompose possible traces of sulfur- and nitrogen-containing compounds that are present in the heavy fraction. This hydrotreatment stage is non-converting, i.e., the conversion of the 370° C.$^+$ fraction into a 370° C.$^-$ fraction is preferably less than 20% by weight, in a preferred manner less than 10% by weight, and in a very preferred manner less than 5% by weight.

The catalysts that are used in this stage (b) are described in stage (b) of the first embodiment.

In the hydrotreatment reactor (3), the feedstock is brought into contact with the catalyst in the presence of hydrogen and at operating temperatures and pressures that make it possible to implement the hydrogenation of olefins that are present in the feedstock. In a preferred manner, the catalyst and the operating conditions that are selected will also make it possible to carry out hydmdeoxygenation, i.e., the decomposition of oxidized compounds (primarily alcohols) and/or the hydrodesulfurization and/or hydrodenitration of possible traces of sulfur- and/or nitrogen-containing compounds that are present in the feedstock. The reaction temperatures that are used in the hydrotreatment reactor are between 100 and 400° C., preferably between 150 and 350° C., and even more preferably between 150 and 300° C. The total pressure range that is used varies from 0.5 to 15 MPa, preferably between 1 and 10 MPa, and in an even more preferred manner between 1 and 9 MPa. The hydrogen that supplies the hydrotreatment reactor is introduced at a flow rate such that the hydrogen/hydrocarbon volumetric ratio is between 50 and 3,000 normal liters per liter, preferably between 100 and 2,000 normal liters per liter, and even more preferably between 150 and 1,500 normal liters per liter. The feedstock flow rate is such that the hourly volumetric flow rate is between 0.1 and 10 $h^{-1}$, preferably between 0.2 and 5 and in an even more preferred manner between 0.2 and 3 $h^{-1}$. Under these conditions, the content of unsaturated and oxidized molecules is reduced to less than 0.5% by weight and to approximately less than 0.1% by weight in general. The hydrotreatment stage is conducted under conditions such that the conversion of products that have boiling points that are greater than or equal to 370° C. into products that have boiling points that are less than 370° C. is limited to 20% by weight, preferably is less than 10% by weight, and even more preferably is less than 5% by weight.
Stage (c)
The effluent (pipe 4) that is obtained from the hydrotreatment reactor (3) is optionally introduced into a water removal zone (5) whose purpose is to eliminate at least partially the water that is produced during hydrotreatment reactions. This elimination of water can be carried out with or without elimination of the gaseous $C_4^-$ fraction, which is generally produced during the hydrotreatment stage. Elimination of water is defined as the elimination of the water that is produced by the reactions for hydrodeoxygenation of oxidized elements, but it is also possible to include the at least partial elimination of the water for saturation of hydrocarbons. The elimination of water can be implemented by all of the methods and techniques that are known to one skilled in the art, for example by drying, by being run over a desiccant, flash, decanting, . . . .

Stage (d)

At least one portion and preferably all of the hydrocarbon fraction (at least one portion of the feedstock or at least one portion of the heavy fraction of stage a) or at least one portion of the fraction or of the hydrotreated and optionally dried feedstock) is then introduced (pipe 6) as well as optionally a hydrogen stream (pipe 7) into the zone (8) that contains the catalyst according to the invention. Another possibility of the process also according to the invention consists in sending a portion or all of the effluent that exits from the hydrotreatment reactor (without drying) into the reactor that contains the catalyst according to the invention and preferably at the same time as a hydrogen stream.

Stage (e)

The hydroisomerized and hydrocracked effluent at the outlet of the reactor (8), stage (d), is sent into a distillation train (9) that integrates an atmospheric distillation, and optionally a vacuum distillation whose purpose is to separate the conversion products with a boiling point of less than 340° C. and preferably less than 370° C. and including in particular those formed during stage (d) in the reactor (8), and to separate the residual fraction whose initial boiling point is generally greater than at least 340° C. and preferably greater than or equal to at least 370° C. Among the conversion products and hydroisomerized products, at least one gasoline fraction (pipe 11) and at least one kerosene middle distillate fraction (pipe 12) and one gas oil middle distillate fraction (pipe 13) are separated in addition to the $C_1$-$C_4$ light gases (pipe 10).

Stage (f)

The process according to the invention uses a second zone (16) that contains a catalyst for hydrocracking and hydroisomerization that is described in the first portion of the patent. In the presence of hydrogen (pipe 15), an effluent that is selected from among a portion of the kerosene that is produced (pipe 12), a portion of gas oil (pipe 13), and the residual fraction, and, preferably, the residual fraction whose initial boiling point is generally greater than at least 370° C. are run over this catalyst.

During this stage, the fraction that enters into the reactor (16) undergoes—upon contact with the catalyst and in the presence of hydrogen—hydroisomerization and/or hydrocracking reactions that will make it possible to improve the quality of the products formed and more particularly the cold properties of kerosene and gas oil, and to obtain improved middle distillate yields relative to the prior art.

The selection of operating conditions makes it possible to finely adjust the quality of the products (middle distillates) and in particular the cold properties.

The operating conditions under which this stage (f) is carried out are the operating conditions in accordance with the process according to the invention.

The user will adjust the operating conditions on the first and second catalyst for hydrocracking and hydroisomerization so as to obtain the qualities of products and the yields that are desired.

Thus, in a general way, on the first catalyst, the conversion per pass of products with boiling points that are greater than or equal to 150° C. into products with boiling points that are less than 150° C. is less than 50% by weight, and preferably less than 30% by weight. These conditions make it possible in particular to adjust the kerosene/gas oil ratio that is produced as well as the cold properties of the middle distillates, and more particularly kerosene.

Also in a general way, on the second catalyst, when the residual fraction is treated, the conversion per pass of products with boiling points that are greater than or equal to 370° C. into products with boiling points that are less than 370° C. is greater than 40% by weight, preferably greater than 50% by weight or, better, greater than 60% by weight. It may even prove advantageous to have conversions of at least 80% by weight.

When a portion of the kerosene and/or gas oil is treated on the second catalyst, the conversion per pass of products with boiling points that are greater than or equal to 150° C. into products with boiling points that are less than 150° C. is less than 50% by weight, preferably less than 30% by weight.

In a general way, the operating conditions that are applied in the reactors (8) and (16) can be different or identical. In a preferred way, the operating conditions that are used in the two hydroisomerization and hydrocracking reactors are selected in different forms in terms of operating pressure, temperature, hourly volumetric flow rate and $H_2$/feedstock ratio.

This embodiment makes it possible for the user to adjust the qualities and/or yields of kerosene and gas oil.

The effluent that is obtained from the reactor (16) is then sent via the line (17) into the distillation train so as to separate the conversion products, gasoline, kerosene and gas oil.

Figure 4:
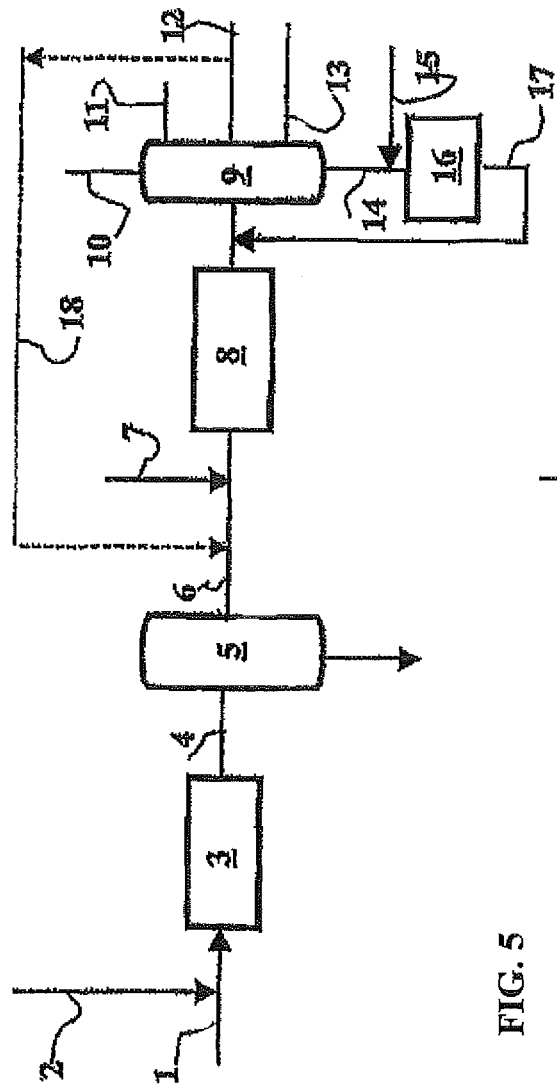

FIG. 4 shows an embodiment with the residual fraction (pipe 14) that passes into the hydroisomerization and hydrocracking zone (16) (stage f), whereby the effluent that is obtained is sent (pipe 17) into the separation zone (9).

Advantageously, in the same step, the kerosene and/or the gas oil can be partially recycled (pipe 18) in the zone (8) for hydroisomerization and hydrocracking (stage d) on the first catalyst.

Figure 5:
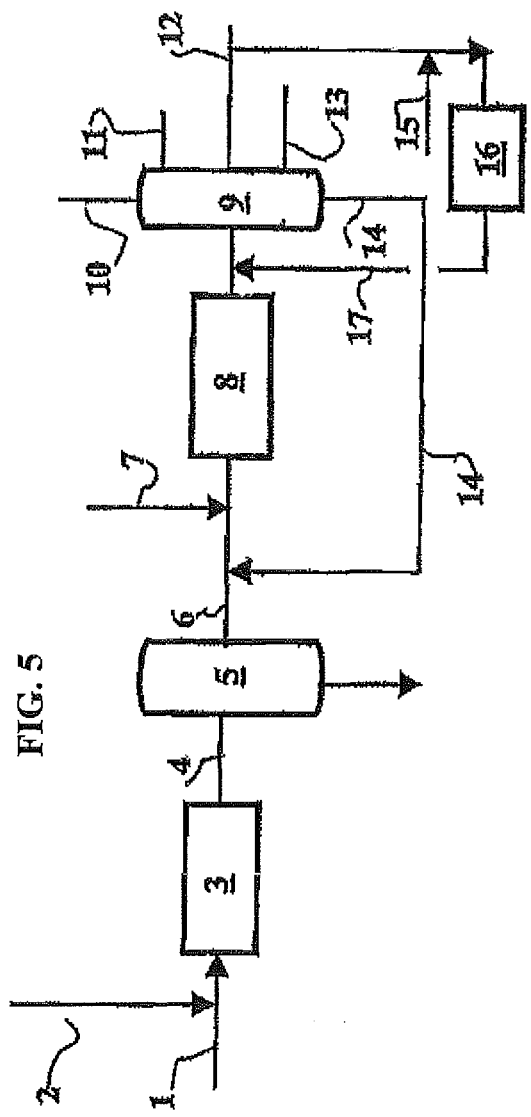

In FIG. 5, a portion of the kerosene and/or gas oil produced runs into the zone (16) for hydroisomerization and hydrocracking (stage f), whereby the effluent that is obtained is sent (pipe 17) into the separation zone (9).

In the same step, the residual fraction (pipe 14) is recycled in the zone (8) for hydroisomerziation and hydrocracking (stage d) on the first catalyst.

It was possible to note that it is advantageous to recycle a portion of the kerosene on a catalyst for hydrocracking and hydroisomerization to improve its cold properties.

The figures show only the recycling of kerosene. It goes without saying that it is also possible to recycle a portion of the gas oil (separately or with kerosene) and preferably on the same catalyst as the kerosene.

e) Fifth Embodiment

Another embodiment of the invention comprises the following stages:
  a) Separation of at least one so-called light gaseous $C_4^-$ fraction, with a final boiling point that is less than 20° C., from the effluent that is obtained from the Fischer-Tropsch synthesis unit so as to obtain a single so-called heavy liquid C5+ fraction with an initial boiling point that is between 20 and 40° C.,
  b) Hydrogenation of the oletinic-type unsaturated compounds of at least one portion of said heavy $C_5^+$ fraction in the presence of hydrogen and a hydrogenation catalyst at a temperature of between 80° C. and 200° C., at a total pressure of between 0.5 and 6 MPa, at an hourly volumetric flow rate of between 1 and 10 $h^{-1}$, and at a hydrogen flow rate that corresponds to a hydrogen/hydrocarbon volumetric ratio of between 5 and 80 normal liters of hydrogen per liter of feedstock,
  c) Running of all of the liquid hydrogenated effluent that is obtained from stage b), without a previous separation stage, in the process according to the invention in the presence of hydrogen and a catalyst according to the invention, d) Distillation of the hydrocracked/hydroisomerized effluent.

Stage (a)

Figure 6:
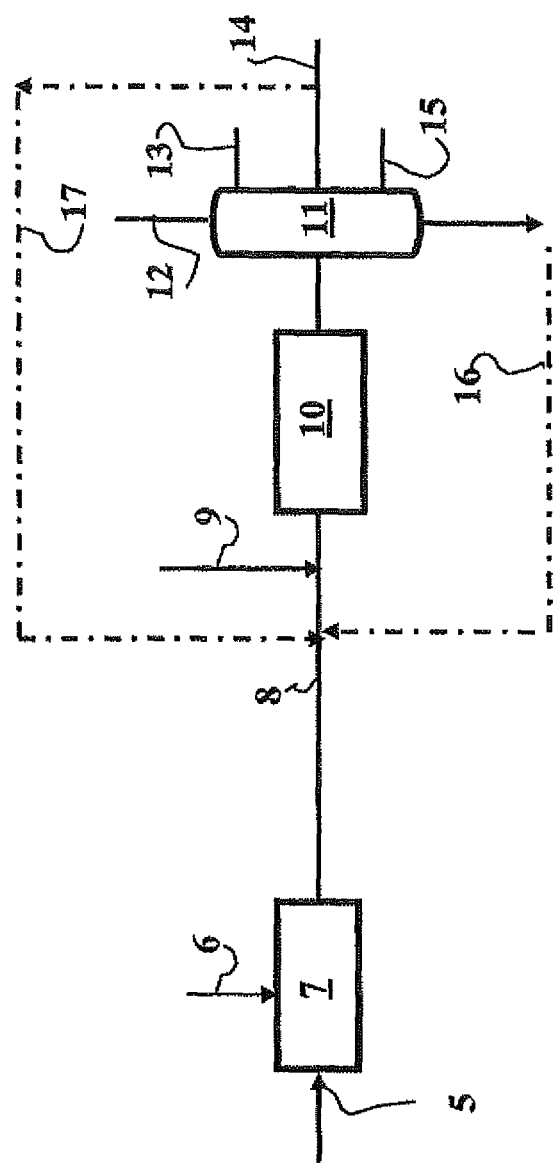

Stage a), not shown in FIG. 6, is a stage for separation of at least one so-called light $C_4^-$ fraction, with a final boiling point that is less than 20° C., preferably less than 10° C., and in a very preferred manner, less than 0° C., from the effluent that is obtained from the Fischer-Tropsch synthesis so as to obtain a single so-called heavy $C_5^+$ fraction with an initial boiling point of between 20 and 40° C. and preferably that has a boiling point that is greater than or equal to 30° C., constituting at least one portion of the feedstock of stage b) for hydrogenation according to the invention.

At the outlet of the Fischer-Tropsch synthesis unit, the effluent that is obtained from the Fischer-Tropsch synthesis unit is advantageously divided into two fractions: a light fraction, called a cold condensate, and a heavy fraction, called waxes.

The two thus defined fractions comprise water, carbon dioxide ($CO_2$), carbon monoxide (CO), and unreacted hydrogen ($H_2$). In addition, the light fraction, cold condensate, contains light $C_1$ to $C_4$ hydrocarbon compounds, called a $C_4^-$ fraction, in gas form.

Figure 7:
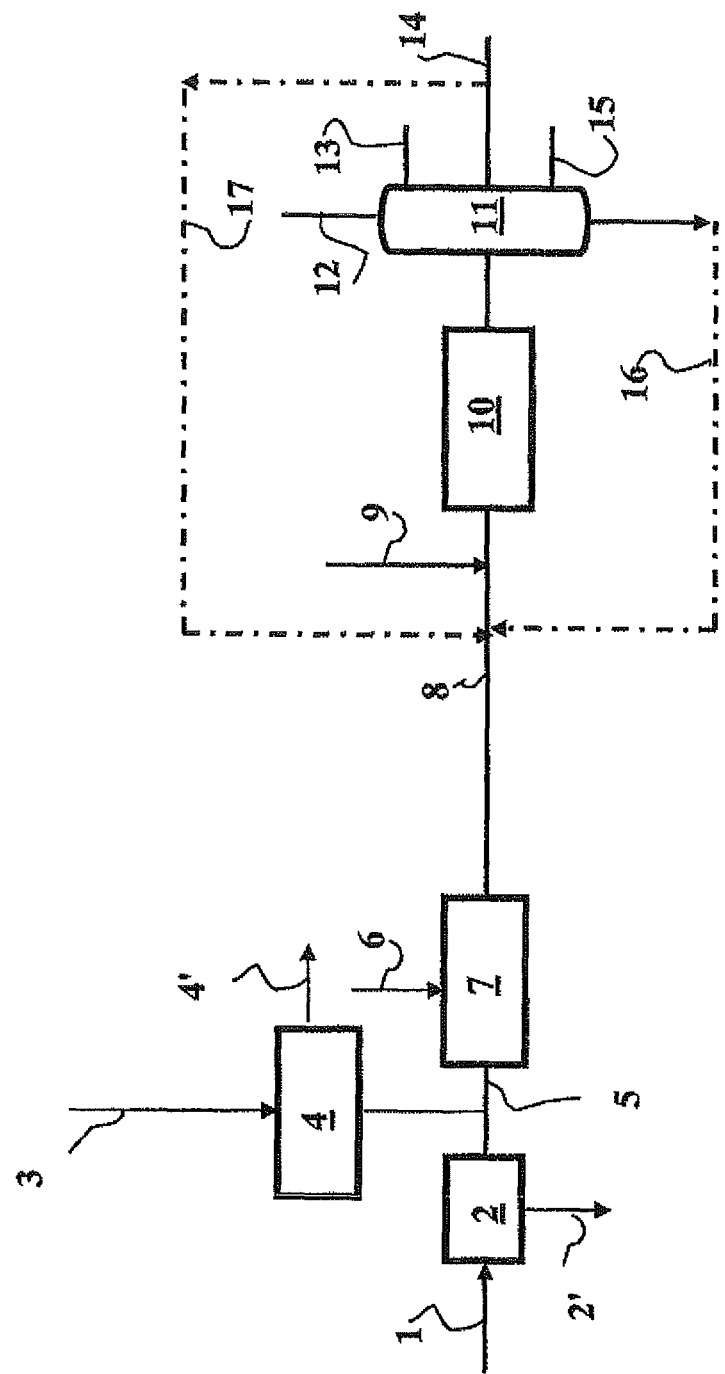

According to a preferred embodiment shown in FIG. 7, the light fraction, called cold condensate (1), and the heavy fraction, called waxes (3), are treated separately in fractionation means that are separated and then recombined in the pipe (5) so as to obtain a single $C_5^+$ fraction with an initial boiling point of between 20 and 40° C. and preferably having a boiling point that is greater than or equal to 30° C. The heavy fraction, called waxes, enters into a fractionation means (4) via the pipe (3). The fractionation means (4) can consist of; for example, methods that are well known to one skilled in the art such as a rapid expansion (or flash, according to English terminology), a distillation or a stripping. Advantageously, an expansion flask or flash or a stripper is sufficient for eliminating the major portion of water, carbon dioxide ($CO_2$), and carbon monoxide (CO) via the pipe (4') of the heavy fraction, called waxes.

The light fraction, called cold condensate, enters into a fractionation means (2) via the pipe (1). The fractionation means (2) can consist of for example, methods that are well known to one skilled in the art, such as an expansion flask or flash, a distillation or a snipping. Advantageously, the fractionation means (2) is a distillation column that makes possible the elimination of light hydrocarbon compounds and gaseous $C_1$ to $C_4$ compounds, called gaseous $C_4^-$ fractions, corresponding to the products that boil at a temperature that is less than 20° C., preferably less than 10° C., and in a very preferred manner less than 0° C., via the pipe (2').

The stabilized effluents that are obtained from the fractionation means (2) and (4) are next recombined in the pipe (5). A stabilized liquid $C_5^+$ fraction, corresponding to the products that boil at an initial boiling point of between 20 and 40° C. and preferably that have a boiling point that is greater than or equal to 30° C., is thus recovered in the pipe (5) and constitutes the feedstock of the hydrogenation stage b) of the process according to the invention.

Figure 8:
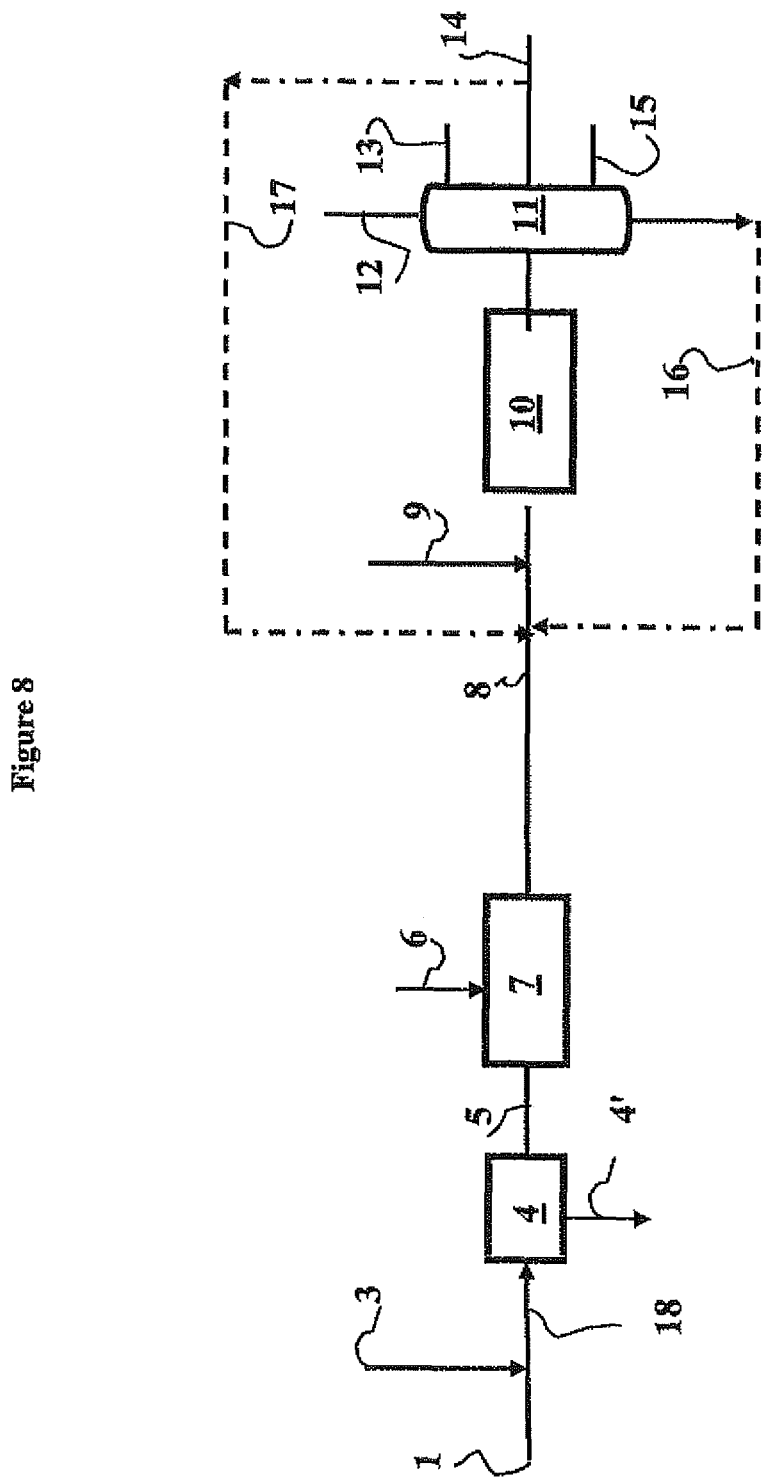

According to another preferred embodiment that is shown in FIG. 8, the light fraction, called cold condensate, exiting from the Fischer-Tropsch synthesis unit via the pipe (1), and the heavy fraction, called waxes, exiting from the Fischer-Tropsch synthesis unit via the pipe (3), are recombined in the pipe (18) and treated in the same fractionation means (4). The fractionation means (4) can consist of, for example, methods that are well known to one skilled in the art, such as flash, distillation or stripping. Advantageously, the fractionation means (4) is a distillation column that makes possible the elimination of the gaseous $C_4^-$ fraction, water, carbon dioxide ($CO_2$), and carbon monoxide (CO) via the pipe (4').

A stabilized, liquid $C_5^+$ fraction, corresponding to the products that boil at a boiling point of between 20 and 40° C. and that preferably have a boiling point that is greater than or equal to 30° C., is thus recovered at the outlet of the fractionation means (4) in the pipe (5) and constitutes the feedstock of the hydrogenation stage b) of the process according to the invention.

Stage (b)

Stage b) is a stage for hydrogenation of the olefinic-type unsaturated compounds of at least one portion and preferably all of the liquid, heavy $C_5^+$ fraction that is obtained from stage a) of the process according to the invention in the presence of hydrogen and a hydrogenation catalyst.

In a preferred manner, the catalyst that is used in stage (b) is a non-cracking or sparingly cracking hydrogenation catalyst that comprises at least one metal of group VIII of the periodic table and that comprises at least one substrate with a refractory oxide base.

Preferably, said catalyst comprises at least one metal of group VIII that is selected from among nickel, molybdenum, tungsten, cobalt, ruthenium, indium, palladium and platinum and that comprises at least one refractory-oxide-based substrate that is selected from among alumina and silica alumina.

In a preferred manner, the metal of group VIII is selected from among nickel, palladium and platinum.

According to a preferred embodiment of stage b) of the process according to the invention, the metal of group VIII is selected from among palladium and/or platinum, and the content of this metal is advantageously between 0.1% and 5% by weight, and preferably between 0.2% and 0.6% by weight relative to the total weight of the catalyst.

According to a very preferred embodiment of stage b) of the process according to the invention, the metal of group VIII is palladium.

According to another preferred embodiment of stage b) of the process according to the invention, the metal of group VIII is nickel, and the content of this metal is advantageously between 5% and 25% by weight, preferably between 7% and 20% by weight relative to the total weight of the catalyst.

The substrate of the catalyst that is used in stage (b) of the process according to the invention is a refractory oxide-based substrate, preferably selected from among alumina and silica alumina.

When the substrate is an alumina, it has a BET specific surface area that makes it possible to limit the polymerization reactions on the surface of the hydrogenation catalyst, whereby said surface area is between 5 and 140 m²/g.

When the substrate is a silica alumina, the substrate contains a percentage of silica of between 5 and 95% by weight, preferably between 10 and 80%, in a more preferred manner between 20 and 60%, and in a very preferred manner between 30 and 50%, a BET specific surface area of between 100 and 550 m²/g, preferably between 150 and 500 m²/g, in a preferred manner less than 350 m²/g, and in an even more preferred manner less than 250 m²/g. The hydrogenation stage b) is preferably conducted in one or more fixed-bed reactor(s).

In the hydrogenation zone (7), the feedstock is brought into contact with the hydrogenation catalyst in the presence of hydrogen and at operating temperatures and pressures that make possible the hydrogenation of olefinic-type unsaturated compounds that are present in the feedstock. Under these operating conditions, the oxidized compounds are not converted; the liquid hydrogenated effluent that is obtained from stage b) of the process according to the invention therefore does not contain water that is obtained from the transformation of said oxidized compounds.

The operating conditions of the hydrogenation stage b) are selected in such a way that the effluent at the outlet of said hydrogenation zone (7) is in the liquid state: actually, the quantity of hydrogen introduced into the hydrogenation zone (7) via the pipe (6) corresponds to a quantity of hydrogen that is in slight excess relative to the quantity of hydrogen that is strictly necessary for implementing the hydrogenation reaction of olefinic-type unsaturated compounds. Thus, cracking is not implemented in the hydrogenation zone (7), and the liquid hydrogenated effluent does not contain hydrocarbon compounds that boil at a temperature that is less than 20° C., preferably less than 10° C., and in a very preferred Manner less than 0° C., corresponding to the gaseous $C_4^-$ fraction.

The operating conditions of the hydrogenation stage b) are as follows: the temperature within said hydrogenation zone (7) is between 80° C. and 200° C., preferably between 100 and 180° C., and in a preferred manner between 120 and 165° C.; the total pressure is between 0.5 and 6 MPa, preferably between 1 and 5 MPa, and in an even more preferred manner between 2 and 5 MPa. The feedstock flow rate is such that the hourly volumetric flow rate (ratio of the hourly volumetric flow rate at 15° C. of fresh liquid feedstock to the volume of charged catalyst) is between 1 and 10 $h^{-1}$, preferably between 1 and 5 $h^{-1}$, and in an even more preferred manner between 1 and 4 $h^{-1}$. The hydrogen that supplies the hydrotreatment zone is introduced at a flow rate such that the hydrogen/hydrocarbon volumetric ratio is between 5 and 80 normal liters of hydrogen per liter of feedstock, preferably between 5 and 60, in a preferred manner between 10 and 50, and in an even more preferred manner between 15 and 35.

Under these conditions, the olefinic-type unsaturated compounds are hydrogenated at more than 50%, preferably at more than 75%, and in a preferred manner at more than 85%.

The hydrogenation stage b) is preferably conducted under conditions such that the conversion of products that have boiling points that are greater than or equal to 370° C. into products that have boiling points of less than 370° C. is zero. The hydrogenated effluent that is obtained from stage b) of the process according to the invention therefore does not contain compounds that boil at a temperature that is less than 20° C., preferably less than 10° C., and in a very preferred manner less than 0° C., corresponding to the gaseous $C_4^-$ fraction.

According to a preferred embodiment of stage b), a guard bed (not shown in the figures) that contains at least one guard-bed catalyst upstream from the hydrogenation zone (7) is used so as to reduce the content of solid mineral particles and optionally to reduce the content of metal compounds that are harmful to the hydrogenation catalysts. The guard bed can advantageously either be integrated in the hydrogenation zone (7) upstream from the hydrogenation catalyst bed or be placed in a separate zone upstream from the hydrogenation zone (7).

Actually, the treated fractions optionally can contain solid particles such as mineral solids. They can optionally contain metals that are contained in hydrocarbon structures such as more or less soluble organometallic compounds. The term fines is defined as the fines that result from physical or chemical attrition of the catalyst. They can be micronic or submicronic. These mineral particles then contain the active components of these catalysts without the following list being limiting: alumina, silica, titanium, zirconia, cobalt oxide, iron oxide, tungsten, ruthenium oxide, . . . . These mineral solids can come in the form of calcined mixed oxide: for example, alumina-cobalt, alumina-iron, alumina-silica, alumina-zirconia, alumina-titanium, alumina-silica-cobalt, alumina-zirconia-cobalt, . . . .

They can also contain metals within hydrocarbon structures, optionally able to contain oxygen or more or less soluble organometallic compounds. More particularly, these compounds can be based on silicon. They can be, for example, anti-foaming agents that are used in the synthesis process. Furthermore, the fines of catalysts described above can have a silica content that is greater than the formulation of the catalyst, resulting from the close interaction between the fines of catalysts and anti-foaming agents described above.

The guard-bed catalysts that are used can advantageously have the shape of spheres or the form of extrudates. It is advantageous, however, that the catalyst comes in the form of extrudates with a diameter of between 0.5 and 5 mm and more particularly between 0.7 and 2.5 mm. The shapes are cylindrical (which may or may not be hollow), braided cylindrical, multilobed (2, 3, 4 or 5 lobes, for example), or rings. The cylindrical shape is used in a preferred manner, but any other shape can be used.

So as to eliminate the presence of contaminants and/or poisons in the feedstock, the guard-bed catalysts can, in another preferred embodiment, have more particular geometric shapes so as to increase their vacuum fraction. The vacuum fraction of these catalysts is between 0.2 and 0.75. Their outside diameter can vary between 1 and 35 mm. Among the possible particular shapes without this list being limiting are the following: hollow cylinders, hollow rings, Raschig rings, notched hollow cylinders, indented hollow cylinders, pentaring cart wheels, multi-hole cylinders, . . . .

Preferably, said guard-bed catalysts that are used are not impregnated by an active phase. The guard beds can be marketed by Norton-Saint-Gobain, for example the MacroTrap® guard beds. The guard beds can be marketed by Axens in the ACT family: ACT077, ACT935. ACT961 or HMC841, HMC845, HMC941 or HMC945. It can be particularly advantageous to superpose these catalysts in at least two different beds of variable height. The catalysts that have the highest void rate are preferably used in the first catalytic bed(s) at the inlet of the catalytic reactor. It may also be advantageous to use at least two different reactors for these catalysts. These guard-bed catalysts that are used can advantageously have macroporosity. In one preferred embodiment, the macroporous volume for a mean diameter at 50 nm is greater than 0.1 $cm^3/g$, and a total volume is greater than 0.60 $cm^3/g$. In another embodiment, the mercury volume for a pore diameter that is greater than 1 micron is greater than 0.5 $cm^3/g$, and the mercury volume for a diameter of pores of greater than 10 microns is greater than 0.25 $cm^3/g$. These two embodiments can be combined in an advantageous manner in a mixed bed or a combined bed. The guard beds that are preferred according to the invention are the HMC and the ACT961.

After running over the guard bed, the content of solid particles is advantageously less than 20 ppm, in a preferred manner less than 10 ppm, and in an even more preferred manner less than 5 ppm. The soluble silicon content is advantageously less than 5 ppm, in a preferred manner less than 2 ppm, and in an even more preferred manner less than 1 ppm.

At the end of stage b), all of the liquid hydrogenated effluent is sent directly into a hydrocracking/hydroisomerization zone (10).

Stage (c)

In accordance with stage c), all of the liquid hydrogenated effluent that is obtained from stage b) is sent directly, without a preliminary separation stage, into the hydroisomerization/hydrocracking process (10) according to the invention containing the hydroisomerization/hydrocracking catalyst that is described in the first part of the patent application and preferably at the same time as a hydrogen stream (pipe 9).

The operating conditions in which the hydrosiomeriation/hydrocracking stage (c) is carried out are the operating conditions that are described in accordance with the process according to the invention.

Stage (d)

The effluent (so-called hydrocracked/hydroisomerized fraction) at the outlet of the hydroisomerization/hydrocracking zone (10), obtained from stage (c), is sent, in accordance with stage d), into a distillation train (11), which integrates an atmospheric distillation and optionally a vacuum distillation, which has the object of separating the conversion products with a boiling point that is less than 340° C. and preferably less than 370° C. and including in particular those formed during stage (c), in the hydroisomerization/hydrocracking reactor (10), and of separating the residual fraction whose initial boiling point is generally greater than at least 340° C. and preferably greater than or equal to at least 370° C. Among the conversion products and the hydroisomerized products, at least one gasoline fraction (or naphtha) (pipe 13) and at least one kerosene middle distillate fraction (pipe 14) and at least one gas oil middle distillate fraction (pipe 15) are separated in addition to the light $C_1$-$C_4$ gases (pipe 12). Preferably, the residual fraction, whose initial boiling point is generally greater than at least 340° C. and preferably greater than or equal to at least 370° C., is recycled (pipe 16) in stage c) at the top of the hydroisomerization and hydrocracking zone (10).

It may also be advantageous to recycle (pipe 17)—in the stage (c) (zone 10)—at least one of the thus obtained kerosene and gas oil fractions at least in part and preferably in its entirety. The gas oil and kerosene fractions are preferably recovered separately or in a mixture, but the fraction points are adjusted by the user based on his needs. It was possible to note that it is advantageous to recycle a portion of the kerosene to improve its cold properties.

The invention is not limited to these five embodiments.

The Products that are Obtained

The gas oil(s) obtained has/have a pour point of at most 0° C., generally less than −10° C., and often less than −15° C. The cetane number is greater than 60, generally greater than 65, and often greater than 70.

The kerosene(s) obtained has/have a freezing point of at most −35° C., generally less than −40° C. The smoke point is greater than 25 mm, and generally greater than 30 mm.

In this process, the production of gasoline (undesirable) is the lowest possible. The gasoline yield that is obtained is always advantageously less than 50% by weight, preferably less than 40% by weight, in a preferred manner less than 30% by weight, in a preferred manner less than 20% by weight, and in an even more preferred manner less than 15% by weight.

EXAMPLES

Example 1

Preparation of the Hydrotreatment Catalyst (C)

The catalyst is an industrial catalyst that is based on palladium-type noble metal on alumina with a palladium content of 0.3% by weight relative to the total weight of the finished catalyst, provided by the AXENS Company.

Example 2

Preparation of the Starting Dealuminified Y Zeolite Z1 According to the Invention 100 g of crude synthesis NaY zeolite is exchanged 3 times by a 1N solution of $NH_4NO_3$ at a temperature of 80° C. to obtain the $NH_4Y$ zeolite. The $NH_4Y$ zeolite then undergoes a heat treatment at 700° C. for 3 hours in the presence of 60% water vapor. The heat treatment is done by using a gas now formed by water vapor and air with 2 L/h/g of zeolite. The zeolite then undergoes a treatment with a solution of 2 mol/L of $HNO_3$ (V/P=15) for 3 hours at 80° C. The zeolite is finally filtered and dried for 12 hours at 120° C. The zeolite is then in dealuminified HY form.

The dealuminified HY zeolite Z1 that is obtained has an overall Si/Al atomic ratio=6.2 that is measured by X fluorescence, a starting extra-lattice aluminum atom fraction by weight that is equal to 37% by weight relative to the total mass of the aluminum that is present in the zeolite and measured by NMR of the aluminum, a starting mespore volume that is measured by nitrogen porosimetry that is equal to 0.15 ml.$g^{-1}$, and a starting crystalline parameter $a_o$ of the elementary mesh that is equal to 24.35 Å, measured by XRD.

Example 3

Preparation of the Starting Dealuminitied V Zeolite Z2 that is Not in Accordance with the Invention The zeolite Z1 that is prepared in Example 1 undergoes a second heat treatment series in the presence of water vapor and an acid attack treatment by acid washing. The second heat treatment is implemented at 750° C. by using 80% water vapor, and the acid solution that is used is 5 mol/L for 5 hours.

The dealuminified HY zeolite Z2 has an overall Si/Al atomic ratio=25.4, measured by X fluorescence, a starting extra-lattice aluminum atom fraction by weight that is equal to 12% by weight relative to the total mass of the aluminum that is present in the zeolite that is measured by NMR of the aluminum, a starting mesopore volume that is measured by nitrogen porosimetry that is equal to 0.18 ml.$g^{-1}$, and a starting crystalline parameter $a_o$ of the elementary mesh that is equal to 24.25 Å, measured by XRD.

Example 4

Preparation of the Modified Zeolite Z3 According to the Invention that is Used in the Catalyst According to the Invention 100 g of dealuminified HY zeolite Z1 with an overall Si/Al atomic ratio=6.2, measured by XP and prepared in Example 1, is mixed with 1 L of a 0.1N sodium hydroxide solution (NaOH) at 60° C. for 30 minutes. After quick cooling in ice water, the suspension is then filtered, and the zeolite is washed at 50° C. and dried for one night at 120° C. The modified dealuminified Y zeolite is then exchanged 3 times by a 1N solution of $NH_4NO_3$ at a temperature of 80° C. to obtain the partially exchanged $NH_4^+$ form. The zeolite is finally calcined at 450° C. for 2 hours under an air flow of 1 L/h/g of zeolite.

The characterizations of the zeolite Z3 that are measured by nitrogen adsorption/desorption, by X fluorescence, by NMR of $^{27}$Al and $^{29}$Si, and by adsorption of pyridine followed by IR are provided in Table 1.

Example 5

Preparation of the Modified Zeolite Z4 that is not in Accordance with the Invention 100 g of dealuminified Y zeolite Z2 with an overall Si/Al ratio that is equal to 25.4 is mixed with 1 L of a 0.3N sodium hydroxide solution at 60° C. for 1 hour and 30 minutes. After quick cooling in ice water, the suspension is then filtered, and the zeolite is washed at 50° C. and dried for one night at 120° C. The modified dealuminified Y zeolite is then exchanged 3 times by a 1N solution of NH$_4$NO$_3$ at a temperature of 80° C. to obtain the partially exchanged NH$_4^+$ form. The zeolite is finally calcined at 450° C. for 2 hours under an air flow of 1 L/h/g of zeolite. The characterizations of the zeolite Z4 that are measured by nitrogen adsorption/desorption, by X fluorescence, by NMR of $^{27}$Al and $^{29}$Si, and by pyridine adsorption followed by IR are provided in Table 1.

TABLE 1

Characterization of the Samples.

| | Unmodified Starting Zeolite Z1 | Unmodified Starting Zeolite Z2 | Modified Zeolite Z3 According to the Invention | Unmodified Zeolite Z4 Not in Accordance with the Invention |
|---|---|---|---|---|
| Overall Si/Al (XF) | 6.2 | 25.4 | 4.7 | 13.8 |
| % Al$_{VI}$ (NMR) | 37 | 12 | 33 | 13 |
| S$_{BET}$ (m$^2$/g) | 778 | 791 | 743 | 709 |
| Mesopore Volume (ml/g) | 0.15 | 0.18 | 0.28 (+86%) | 0.30 (+72%) |
| Micropore Volume (ml/g) | 0.28 | 0.27 | 0.25 (−11%) | 0.14 (−44%) |
| Bronsted Acidity (i.a.) | 4.3 | 2.1 | 5.4 (+25%) | 1.9 (−10%) |

Example 6

Preparation of the Catalysts

The catalyst substrates according to the invention that contain the modified zeolites (Z3 according to the invention and Z4 not in accordance with the invention) or unmodified zeolites (Z1 and Z2) are produced by using 5 g of zeolite mixed with 95 g of a matrix that consists of ultrafine tabular boehmite or alumina gel marketed under the name SB3 by the Condéa Chemie GmbH Company. This powder mixture is then mixed with an aqueous solution that contains nitric acid at 66% by weight (7% by weight of acid per gram of dry gel), and then kneaded for 15 minutes. The kneaded paste is then extruded through a die with a diameter of 10.2 mm. The extrudates are then calcined at 500° C. for 2 hours in air.

The substrate extrudates that are thus prepared are impregnated in the dry state by an aqueous solution of tetraamine platinum nitrate Pt(NH$_3$)$_4$(NO$_3$)$_2$, left to mature in a water-aging reactor for 24 hours at ambient temperature, and then calcined at 450° C. (rise slope of 5° C./min) for two hours in a bed flushed in dry air (21 of air/h/grain of solid). The contents by weight of oxides of the catalysts that are obtained are indicated in Table 2.

The catalysts C1, C2, C3 and C4 are thus prepared starting from unmodified zeolites Z1 and Z2 and modified zeolites Z3 according to the invention and Z4, not in accordance with the invention, respectively. The contents by weight of oxides of the catalysts that are obtained are indicated in Table 2.

TABLE 2

Characteristics of the Catalysts.

| | Reference of the Catalyst | | | |
|---|---|---|---|---|
| | C1 (Not in Accordance with the Invention) | C2 (Not in Accordance with the Invention) | C3 (According to the Invention) | C4 (Not in Accordance with the Invention) |
| Catalyst-Based Zeolite | Unmodified Z1 | Unmodified Z2 | Z3 that is Modified According to the Invention | Modified Z4 |
| PtO (% by weight) | 0.7 | 0.7 | 0.6 | 0.7 |
| Overall SiO$_2$ (% by weight) | 4.3 | 4.8 | 4.1 | 4.6 |
| Made up to 100% (for the most part consists of Al$_2$O$_3$, % by weight) | 95 | 94.5 | 95.3 | 94.7 |

Example 6

Comparison of the Hydrocracking Catalysts During Treatment of a Feedstock that is Obtained from Fischer-Tropsch in Accordance with the Embodiment B) of the Process According to the Invention A feedstock that is obtained from Fischer-Tropsch synthesis on a cobalt catalyst is separated into two fractions, the heaviest fraction having the characteristics that are provided in Table 3.

TABLE 3

Characteristics of the Heavy Fraction.

| Simulated Distillation | T (5% by Weight): 175° C. |
|---|---|
| | T (30% by Weight): 250° C. |
| | T (50% by Weight): 307° C. |
| | T (70% by Weight): 378° C. |
| | T (95% by Weight): 525° C. |
| 370° C.$^+$ Compounds (by GC [Gas Chromatography]) | 33% by Weight |
| Density at 15° C. | 0.791 |
| Nitrogen Content | <Detection Limit |
| Sulfur Content | 4 ppm |
| Detailed Analysis of the C$_{30}^-$ Fraction (GC) | |
| n-Paraffins | 81% by Weight |
| i-Paraffins | 5% by Weight |
| Olefins | 12% by Weight |
| Oxidized Elements | 2% by Weight |

This heavy fraction is treated in a bed flushed with lost hydrogen on the hydrotreatment catalyst C under operating conditions that make possible the elimination of the olefinic and oxidized compounds as well as traces of nitrogen. The operating conditions that are selected are as follows:

Hourly volumetric flow rate (volume of feedstock/volume of catalyst/hour)=2 h$^{-1}$ Total working pressure: 6 MPa Hydrogen/feedstock ratio: 200 normal liters/liter Temperature: 270° C.

After this hydrotreatment, the contents of olefins, oxidized elements, and sulfur-containing compounds of the effluent drop below detection thresholds, whereas the conversion of the 370° C.$^+$ fraction into a 370° C.$^-$ fraction is negligible (less than 5% by weight). The carbon monoxide and/or carbon dioxide and/or water and/or hydrogen sulfide formed during the hydrotreatment are eliminated by a flash and decanting stage. The characteristics of the hydrotreated heavy fraction are indicated in Table 4.

TABLE 4

Characteristics of the Heavy Fraction After Hydrotreatment.

| Simulated Distillation | T (5% by Weight): 172° C. |
| --- | --- |
|  | T (30% by Weight): 244° C. |
|  | T (50% by Weight): 308° C. |
|  | T (70% by Weight): 374° C. |
|  | T (95% by Weight): 520° C. |
| 370° C.$^+$ Compounds (by GC) | 32% by Weight |
| Density at 15° C. | 0.786 |
| Nitrogen Content | <Detection Limit |
| Sulfur Content | <Detection Limit |
| Detailed Analysis of the C$_{30}$$^-$ Fraction (GC) |  |
| n-Paraffins | 93% by Weight |
| i-Paraffins | 7% by Weight |
| Olefins | <Detection Limit |
| Oxidized Elements | <Detection Limit |

The hydrotreated effluent constitutes the hydrocracking feedstock that is sent to the hydroisomerization and hydrocracking catalysts C1, C2, and C4 that are not in accordance with the invention and C3 according to the invention.

Before the testing, the catalysts undergo a reduction stage under the following operating conditions:

Hydrogen flow rate: 1,600 normal liters per hour and per liter of catalyst,

Rise in ambient temperature to 120° C.: 10° C./minute,

Plateau level for one hour at 120° C.,

Rise from 120° C. to 450° C. at 5° C./minute,

Plateau level for two hours at 450° C.,

Pressure: 0.1 MPa

After reduction, the catalytic test is carried out under the following conditions in a bed flushed with lost hydrogen:

Total pressure of 7 MPa,

Hydrogen to feedstock ratio of 600 normal liters/liter,

Hourly volumetric flow rate equal to 1.5 h$^{-1}$.

The conversion of the 370° C.$^+$ fraction is assumed to be equal to:

$$C(370° C.^+)=[(\% \text{ of } 370° C.^- \text{ effluents})-(\% \text{ of } 370° C.^- \text{ feedstock})]/[100-(\% \text{ of } 370° C.^- \text{ feedstock})]$$

with

% of 370° C. effluents=mass percentage of compounds that have boiling points that are less than 370° C. in the effluents, and % of 370° C. feedstock=mass percentage of compounds that have boiling points that are less than 370° C. in the hydrocracking feedstock.

The analyses by gas phase chromatography make it possible to obtain the distribution of different fractions in the hydrocracked effluents:

C$_1$-C$_4$ fraction: hydrocarbons with 1 to 4 carbon atoms inclusive,

C$_5$-C$_9$ fraction: hydrocarbons with 5 to 9 carbon atoms inclusive (naphtha fraction), C$_{10}$-C$_{14}$ fraction: hydrocarbons with 10 to 14 carbon atoms inclusive (kerosene fraction), C$_{15}$-C$_{22}$ fraction: hydrocarbons with 15 to 22 carbon atoms inclusive (gas oil fraction), C$_{22+}$ fraction: hydrocarbons with more than 22 carbon atoms (370° C.$^+$ fraction).

The catalytic performance levels are expressed in terms of the temperature that is necessary for reaching a conversion level of the 370° C.$^+$ fraction that is equal to 70% and by the yields in the different fractions at this conversion level. The catalytic performance levels are measured on the catalysts after a stabilization period, generally at least 48 hours, has been observed. Table 5 records the performance levels achieved with the catalysts C1, C2, and C4 that are not in accordance with the invention, and C3 according to the invention.

TABLE 5

Catalytic Performance Levels of the Catalysts C1, C2, C3 and C4 with 70% Conversion of the 370° C.$^+$ Fraction.

| Catalyst | Temperature ° C. | C$_1$-C$_4$ Fraction % by Weight | C$_5$-C$_9$ Naphtha Fraction % by Weight | C$_{10}$-C$_{14}$ Kerosene Fraction % by Weight | C$_{15}$-C$_{22}$ Gas Oil Fraction % by Weight |
| --- | --- | --- | --- | --- | --- |
| C1 Not in Accordance with the Invention (Prepared from Unmodified Z1) | 294 | 4.6 | 9.4 | 34.7 | 41.7 |
| C2 Not in Accordance with the Invention (Prepared from Unmodified Z2) | 313 | 4.3 | 9.6 | 34.9 | 41.6 |
| C3 According to the Invention (Prepared from Modified Z3 According to the Invention) | 290 | 3.7 | 7.5 | 36.7 | 42.5 |
| C4 Not in Accordance with the Invention (Prepared from Modified Z4) | 319 | 4.4 | 9.8 | 34.8 | 41.5 |

The make-up to 100% is the unconverted C22+ fraction.

The process according to the invention demonstrates that the catalyst that contains a modified zeolite according to the invention and that is used in said process according to the invention is more active and leads to using a lower temperature than the catalysts that are not in accordance with the invention for obtaining a conversion level of 70% by weight of the 370° C. fraction while obtaining higher middle distillate yields and therefore lower, undesirable yields of C$_1$-C$_1$ fractions and naphthas than a process for the production of middle distillates from a paraffinic feedstock that is produced by Fischer-Tropsch synthesis, implementing a catalyst that is not in accordance with the invention and that contains a zeolite that may or may not be modified in a manner that is not in accordance with the invention.

Thus, the catalyst C3 that is prepared with the modified zeolite Z3 according to the invention provides a hydrocracking and/or hydroisomerization activity of a paraffinic feedstock that is produced by Fischer-Tropsch synthesis and a clearly improved selectivity of middle distillates (kerosene+ gas oil) relative to the catalysts C2 and C4 that are respectively prepared from an unmodified zeolite and not having the required overall Si/Al ratio Z2 and from a modified zeolite Z3 that is prepared from Z2 but also relative to the catalyst C1 that is prepared from the starting unmodified zeolite Z1.

The invention claimed is:

1. A process for the production of middle distillates from a paraffinic feedstock, produced by Fischer-Tropsch synthesis, said process comprising:
subjecting said paraffinic feedstock to hydrocracking and/or hydro-isomerization in the presence of a hydrocracking and/or hydro-isomerization catalyst, wherein said catalyst comprises:
at least one hydro-dehydrogenating metal selected from the metals of group VIB and group VIII of the periodic table, wherein the metals of group VIII of are selected from iron, cobalt, nickel, and mixtures thereof, taken by themselves or in a mixture, and
a substrate comprising at least one dealuminified Y zeolite having an initial overall atomic ratio of silicon to aluminum of between 2.5 and 20, a starting extra-lattice aluminum atom fraction by weight that is greater than 10%, relative to the total mass of the aluminum that is present in the zeolite, a starting mesopore volume, measured by nitrogen porosimetry that is greater than 0.07 ml.g$^{-1}$, and a starting crystalline parameter $a_o$ of the elementary mesh of between 24.38 Å and 24.30 Å, whereby said zeolite is modified by a process comprising:
a basic treatment stage wherein said dealuminified Y zeolite is mixed with a basic aqueous solution, wherein said basic aqueous solution is a solution of basic compounds selected from alkaline bases and the strong non-alkaline bases, wherein said basic treatment stage is implemented at a temperature of between 40 and 100° C. and for a time period of between 5 minutes and 5 hours, and
at least one heat treatment stage that is implemented at a temperature of between 200 and 700° C.;
wherein, after being modified, the dealuminified Y zeolite has a mesopore volume, measured by nitrogen porosimetry, that is greater than at least 10% relative to the mesopore volume before modification.

2. The process according to claim 1, in which the metals of group VIII of said hydrocracking and/or hydroisomerization catalyst are selected from noble metals of group VIII.

3. The process according to claim 2, in which the content of noble metal in said hydrocracking and/or hydroisomerization catalyst is between 0.01 and 10% by weight relative to the total mass of said catalyst.

4. The process according to claim 1, in which said hydrocracking and/or hydroisomerization catalyst comprises at least one metal of group VIB in combination with at least one non-noble metal of group VIII, wherein the metal content of group VIB is, in oxide equivalent, between 5 and 40% by weight relative to the total mass of said catalyst, and the non-noble metal content of group VIII is, in oxide equivalent, between 0.5 and 10% by weight relative to the total mass of said catalyst.

5. The process according to claim 1, in which, before being modified, the dealuminified Y zeolite has an initial overall atomic ratio of silicon to aluminum of between 2.7 and 10.0.

6. The process according to claim 1, in which, before being modified, the dealuminified Y zeolite has a starting extra-lattice aluminum atom fraction by weight that is greater than 30% by weight relative to the total mass of the aluminum that is present in the zeolite.

7. The process according to claim 1, in which the alkaline bases used in the basic aqueous solution are selected from alkaline carbonates and alkaline hydroxides, and the non-alkaline bases are selected from quaternary ammonium compounds, taken by themselves or in a mixture.

8. The process according to claim 1, in which the aqueous solution is a sodium carbonate or sodium hydroxide solution.

9. The process according to claim 1, wherein in the basic treatment stage said dealuminified Y zeolite is mixed with said basic aqueous solution of compounds that are selected from alkaline bases wherein the alkaline cations belong to groups IA or IIA of the periodic table, and the process for modification of said zeolite comprises a further stage wherein at least a portion of the alkaline cations belonging to the groups IA and IIA of the periodic table that are introduced during the basic treatment stage by exchange with $NH_4^+$ cations.

10. The process according to claim 1, wherein in the basic treatment stage said dealuminified Y zeolite is mixed with said basic aqueous solution of compounds, wherein the compounds are non-alkaline bases selected from quaternary ammonium compounds, taken by themselves or in a mixture, and the process for modification of said dealuminified Y zeolite does not comprise a stage wherein there is an at least a partial cation exchange before the at least one heat treatment stage.

11. The process according to claim 1, in which said process is performed at a temperature of between 240 and 400° C., at a pressure of between 1 and 9 MPa, the ratio of the hourly volumetric flow rate at 15° C. of fresh liquid feedstock to the volume of charged catalyst is between 0.5 and 5 h$^{-1}$, and at a hydrogen flow rate that is adjusted to obtain a ratio of 400 to 1,500 normal liters of hydrogen per liter of feedstock.

12. The process according to claim 1, in which said process is implemented according to the following:
fractionation of the feedstock;
optional hydrotreatment of at least one portion of the fractionated feedstock obtained from said fractionation;
optional removal of at least one portion of water and optionally CO, $CO_2$, $NH_3$, and $H_2S$;
subjecting at least one portion of the optionally hydrotreated fraction with boiling points that are greater than or equal to 370° C. to said hydrocracking and/or hydroisomerization in the presence of a hydrocracking and/or hydro-isomerization catalyst recited in claim 1 to obtain products with boiling points that are less than 370° C. is greater than 40% by weight;
distillation of the resultant hydrocracked/hydroisomerized fraction to obtain middle distillates and a residual fraction that boils above said middle distillates, and optionally recycling the residual fraction that boils above said middle distillates to said hydrocracking and/or hydroisomerization.

13. The process according to claim 2, wherein the metals of group VIII of said hydrocracking and/or hydroisomerization catalyst are selected from platinum, palladium, and mixtures thereof.

14. The process according to claim 1, wherein the metals of group VIB of said hydrocracking and/or hydroisomerization catalyst are selected from tungsten, molybdenum and mixtures thereof.

15. The process according to claim 1, in which, before being modified, the dealuminified Y zeolite has an initial overall atomic ratio of silicon to aluminum of between 2.6 and 12.0.

16. The process according to claim 1, in which, before being modified, the dealuminified Y zeolite has a starting extra-lattice aluminum atom fraction by weight that is greater than 20% by weight relative to the total mass of the aluminum that is present in the zeolite.

17. The process according to claim 1, in which, before being modified, the dealuminified Y zeolite has a mesopore volume, measured by nitrogen porosimetry, of greater than $0.10 \text{ ml.g}^{-1}$.

18. The process according to claim 1, in which, before being modified, the dealuminified Y zeolite has a mesopore volume, measured by nitrogen porosimetry, of greater than $0.13 \text{ ml.g}^{-1}$.

19. The process according to claim 1, in which, before being modified, the dealuminified Y zeolite has a micropore volume, measured by nitrogen porosimetry, of greater than $0.20 \text{ ml.g}^{-1}$.

20. The process according to claim 1, in which, before being modified, the dealuminified Y zeolite has a micropore volume, measured by nitrogen porosimetry, of greater than $0.25 \text{ ml.g}^{-1}$.

21. The process according to claim 1, in which, after being modified, the dealuminified Y zeolite has a mesopore volume, measured by nitrogen porosimetry, that is greater than at least 20% relative to the mesopore volume before modification.

* * * * *